United States Patent
Jang et al.

(10) Patent No.: US 10,975,476 B2
(45) Date of Patent: Apr. 13, 2021

(54) IRIDIUM OXIDE ELECTRODEPOSITED POROUS TITANIUM COMPOSITE LAYER OF POLYMER ELECTROLYTE MEMBRANE WATER ELECTROLYSIS APPARATUS, METHOD FOR PREPARING THE SAME, AND POLYMER ELECTROLYTE MEMBRANE WATER ELECTROLYSIS APPARATUS USING THE SAME

(71) Applicant: KOREA INSTITUTE OF SCIENCE AND TECHNOLOGY, Seoul (KR)

(72) Inventors: Jong Hyun Jang, Seoul (KR); Seunghoe Choe, Seoul (KR); Youngseung Na, Seoul (KR); Hye Jin Lee, Seoul (KR); Ahyoun Lim, Seoul (KR); Hyoung-Juhn Kim, Seoul (KR); Dirk Henkensmeier, Seoul (KR); Sung Jong Yoo, Seoul (KR); Jin Young Kim, Seoul (KR); So Young Lee, Seoul (KR); Hyun Seo Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 58 days.

(21) Appl. No.: 16/198,286

(22) Filed: Nov. 21, 2018

(65) Prior Publication Data

US 2019/0161868 A1    May 30, 2019

(30) Foreign Application Priority Data

Nov. 29, 2017  (KR) .................. 10-2017-0161523

(51) Int. Cl.
*C25B 1/04* (2021.01)
*C25D 9/06* (2006.01)
(Continued)

(52) U.S. Cl.
CPC .................. *C25B 1/04* (2013.01); *C25B 9/23* (2021.01); *C25B 11/031* (2021.01);
(Continued)

(58) Field of Classification Search
None
See application file for complete search history.

(56) References Cited

U.S. PATENT DOCUMENTS

| 2006/0065521 A1* | 3/2006 | Liu ........................ C25B 13/02 |
| | | 204/296 |
| 2008/0199774 A1* | 8/2008 | Giddey ............... H01M 4/8626 |
| | | 429/209 |

(Continued)

FOREIGN PATENT DOCUMENTS

| JP | 2013-49888 A | 4/2009 |
| JP | 2014-152341 A | 8/2014 |

(Continued)

OTHER PUBLICATIONS

Ges et al, Differential pH measurements of metabolic cellular activity in nl culture vols. using microfabricated iridium oxide electrodes, Biosensors and Bioelectronics, vol. 22, No. 7, Feb. 2007, pp. 1303-1310 (Year: 2007).*

(Continued)

*Primary Examiner* — Harry D Wilkins, III
(74) *Attorney, Agent, or Firm* — Birch, Stewart, Kolasch & Birch, LLP

(57) ABSTRACT

The present disclosure relates to an $IrO_2$ electrodeposited porous titanium composite layer of a polymer electrolyte membrane water electrolysis apparatus serving as both a diffusion layer and an oxygen electrode, the apparatus including: a porous titanium (Ti) layer; and an electrodeposited iridium oxide ($IrO_2$) layer on the porous Ti layer. The $IrO_2$ layer may be uniformly deposited on a porous Ti layer (Continued)

through an electrolysis process, and the electrodeposited $IrO_2$ layer may play multiple roles as not only a catalyst layer toward oxygen evolution reaction (OER) on the surface of the Ti layer, but also a corrosion-protection layer which prevents an inner Ti layer from corrosion.

14 Claims, 23 Drawing Sheets

(51) Int. Cl.
  *C25B 9/23* (2021.01)
  *C25B 11/031* (2021.01)
  *C25B 11/075* (2021.01)
  *C25B 11/063* (2021.01)
  *C25B 11/052* (2021.01)
  *C25D 9/04* (2006.01)

(52) U.S. Cl.
  CPC .......... *C25B 11/052* (2021.01); *C25B 11/063* (2021.01); *C25B 11/075* (2021.01); *C25D 9/04* (2013.01); *C25D 9/06* (2013.01)

(56) References Cited

U.S. PATENT DOCUMENTS

| | | | | |
|---|---|---|---|---|
| 2009/0288856 | A1* | 11/2009 | Sandoval | C23C 18/1216 174/126.2 |
| 2011/0079518 | A1* | 4/2011 | Morimitsu | C25C 1/08 205/603 |
| 2012/0247971 | A1* | 10/2012 | Morimitsu | C25C 7/02 205/560 |
| 2014/0353148 | A1* | 12/2014 | Cao | C25B 11/081 204/290.14 |
| 2014/0374248 | A1* | 12/2014 | Datz | B32B 37/0053 204/282 |
| 2015/0075978 | A1* | 3/2015 | Cao | C25B 11/091 204/290.12 |
| 2017/0321334 | A1* | 11/2017 | Kuhl | C25B 9/10 |
| 2019/0071786 | A1* | 3/2019 | Jang | C25B 9/10 |

FOREIGN PATENT DOCUMENTS

| | | | |
|---|---|---|---|
| KR | 10-2009-0032313 | A | 4/2009 |
| KR | 10-2010-0110758 | A | 10/2010 |
| KR | 10-2011-0124415 | A | 11/2011 |
| KR | 10-2017-0058352 | A | 5/2017 |
| KR | 10-2017-0093039 | A | 8/2017 |

OTHER PUBLICATIONS

Marzouk, Improved Electrodeposited Iridium Oxide pH Sensor Fabricated on Etched Titanium Substrate, Analytical Chemistry, vol. 75, No. 6, Feb. 2003, pp. 1258-1266 (Year: 2003).*
Petit et al, Anodic electrodeposition of iridium oxide films, Journal of Electroanalytical Chemistry, vol. 444, No. 2, Mar. 1998, pp. 247-252 (Year: 1988).*
Choe et al, Electrodeposited IrO2/Ti electrode as durable and cost-effective anodes in high-temperature polymer-membrane-electrolyte water electrolyzers, Applied Catalysis B: Environmental, vol. 226, Jun. 2018, pp. 289-294 (Year: 2018).*
Siracusano et al., "The influence of iridium chemical oxidation state on the performance and durability of oxygen evolution catalysts in PEM electrolysis," Journal of Power Sources (2017), vol. 366, pp. 105-114.
Aili et al., "Phosphoric acid doped membranes based on Nafion®, PBI and their blends—Membrane preparation, characterization and steam electrolysis testing", International Journal of Hydrogen Energy, 2011, vol. 36, pp. 6985-6993.
Antonucci et al., "High temperature operation of a composite membrane-based solid polymer electrolyte water electrolyser", Electrochimica Acta, 2008, vol. 53, pp. 7350-7356.
Baglio et al., "Solid Polymer Electrolyte Water Electrolyser Based on Nafion-$TiO_2$ Composite Membrane for High Temperature Operation", Fuel Cells, 2009, vol. 9, No. 3, pp. 247-252.
Hansen et al., "PEM steam electrolysis at 130 °C using a phosphoric acid doped short side chain PFSA membrane", International Journal of Hydrogen Energy, 2012, vol. 37, pp. 10992-11000.
Lee et al., "Development of electrodeposited $IrO_2$ electrodes as anodes in polymer electrolyte membrane water electrolysis", Applied Catalysis B: Environmental, 2015, vol. 179, pp. 285-291.
Lee et al., "Polarization characteristics of a low catalyst loading PEM water electrolyzer operating at elevated temperature", Journal of Power Sources, 2016, vol. 309, pp. 127-134.
Li et al., "Effects of operating conditions on performance of high-temperature polymer electrolyte water electrolyzer", Journal of Power Sources, 2016, vol. 318, pp. 192-199.
Li et al., "Optimum structural properties for an anode current collector used in a polymer electrolyte membrane water electrolyzer operated at the boiling point of water", Journal of Power Sources, 2016, vol. 332, pp. 16-23.
Lu et al., "Investigation on $IrO_2$ supported on hydrogenated $TiO_2$ nanotube array as OER electro-catalyst for water electrolysis", International Journal of Hydrogen Energy, 2017, vol. 42, pp. 3572-3578.
Mališ et al., "Nafion 117 stability under conditions of PEM water electrolysis at elevated temperature and pressure", International Journal of Hydrogen Energy, 2016, vol. 41, pp. 2177-2188.
Mazur et al., "Non-conductive $TiO_2$ as the anode catalyst support for PEM water electrolysis", International Journal of Hydrogen Energy, 2012, vol. 37, pp. 12081-12088.
Natarajan et al., "Effect of treatment temperature on the performance of $RuO_2$ anode electrocatalyst for high temperature proton exchange membrane water electrolysers", International Journal of Hydrogen Energy, 2013, vol. 38, pp. 16623-16630.
Skulimowska et al., "Proton exchange membrane water electrolysis with short-side-chain Aquivion®membrane and $IrO_2$ anode catalyst", International Journal of Hydrogen Energy, 2014, vol. 39, pp. 6307-6316.
Xu et al., "Performance of a high temperature polymer electrolyte membrane water electrolyser", Journal of Power Sources, 2011, vol. 196, pp. 8918-8924.

* cited by examiner

— 50 μm

— 10 μm

IRIDIUM OXIDE ELECTRODEPOSITED POROUS TITANIUM COMPOSITE LAYER OF POLYMER ELECTROLYTE MEMBRANE WATER ELECTROLYSIS APPARATUS, METHOD FOR PREPARING THE SAME, AND POLYMER ELECTROLYTE MEMBRANE WATER ELECTROLYSIS APPARATUS USING THE SAME

CROSS-REFERENCE TO RELATED APPLICATION

This application claims the priority of Korean Patent Application No. 10-2017-0161523, filed on Nov. 29, 2017, and all the benefits accruing therefrom under 35 U.S.C. § 119, the contents of which in its entirety are herein incorporated by reference.

BACKGROUND

1. Field

The present disclosure relates to an $IrO_2$ electrodeposited porous titanium composite layer for a polymer electrolyte membrane water electrolysis (PEMWE), a method for preparing the same, and a polymer electrolyte membrane water electrolysis apparatus using the same.

[Description of the National Support Research and Development]

This study was conducted with the support from the National Research Foundation of Korea funded by the Ministry of Science and ICT under the supervision of the Korea Institute of Energy Research, the project title is the KOREA CCS 2020 Project, and the project name is 'Development of innovation technology for $CO_2$ conversion to syn-gas by low temperature electrolysis' (2N52570)(Project Identification No. 1711057994).

This study was conducted with the support from the National Research Foundation of Korea funded by the Ministry of Science and ICT under the supervision of the Korea Institute of Energy Research, the project title is the development of climate change mitigation technology, and the project name is 'Development of innovative technologies for low-cost and durable low-Pt electrocatalysts and electrodes for PEMFC MEAs (2N52950)(Project Identification No. 1711060115).

2. Description of the Related Art

Hydrogen is rapidly emerging as an alternative as a future energy carrier for overcoming issues related to environment and coal exhaustion. However, currently, the production of hydrogen is mainly dependent on petrochemical processes such as steam-reforming of natural gas (48%), partial oxidation (30%), and coal gasification (18%), and inevitably emits carbon into atmosphere. Water electrolysis, a technology to decompose water into hydrogen and oxygen gases using electricity, may produce clean hydrogen with zero- or low-carbon footprint.

Currently, the alkaline water electrolysis (AWE) has occupied most of electrolyzer market, but there are drawbacks in that the purity of hydrogen produced is relatively low, there is a need for large-scale plant, and toxic solvents are inevitably used.

As an alternative, the polymer electrolyte membrane water electrolysis (PEMWE) has received attention particularly for small-scale hydrogen production (<300 kW) and surplus power storage because the PEMWE may produce hydrogen having excellent purity at a high yield. Besides, the PEMWE has been widely used because there are advantages in that the system has a small volume and harmful materials are not emitted, and the R&D know how from its sister technology, polymer electrolyte fuel cell (PEMFC), has also provided significant insight for further development of the PEMWE.

However, the use of the PEMWE has a drawback in that the price of produced hydrogen (4.1 to 8.6 €/kgH$_2$) is relatively high compared to that of the AWE (3.2 to 5.9 €/kgH$_2$), and the high price is mainly ascribed by electricity cost (1.2 to 4.0 €/kgH$_2$), stack replacement cost (0.86 to 2.8 €/kgH$_2$), and capital cost (0.85 to 2.9 €/kgH$_2$). The unit cell of conventional PEMWE is composed of a Ti bipolar plate/a Ti-based diffusion layer/an $IrO_2$ catalyst (1 to 5 mg/cm$^2$)/a nafion membrane/a Pt catalyst (0.5 to 1 mg/cm$^2$)/a carbon-based diffusion layer/a graphite bipolar plate. The corresponding unit cell is generally operated under a temperature condition of 60 to 90° C. and an atmosphere pressure condition, and at this time, the cell voltage exhibits, for example, 1.55 to 1.8 V at 1 A/cm$^2$.

Meanwhile, in order to reduce the hydrogen production cost by the PEMWE, studies have been continuously conducted to lower voltage loss for reducing electricity cost and improve cell durability for reducing stack replacement cost, and studies for reducing capital & stack replacement cost have been continuously conducted.

Among them, lowering voltage loss can be accomplished by boosting oxygen evolution reaction (OER) at anode, which is a major contributor for voltage loss, by developing efficient catalyst and membrane electrolyte, and the cell durability issues can be resolved by using a coated (Au, Pt) bipolar plate or a stable membrane.

Meanwhile, the high temperature polymer electrolyte membrane water electrolysis (HT-PEMWE), which is operated at a high temperature range (100° C.≤T≤200° C.), may be expected to provide better cell efficiency and lower electricity cost than conventional PEMWE. Among them, the better cell efficiency is associated with fast electrode reaction due to better electrode kinetics and lower equilibrium voltage, and for example, when the temperature is raised from 80 to 120° C., the rate constant is raised up at least 4-folds because the activation energy for oxygen evolution reaction on an $IrO_2$ catalyst is 40 to 58 kJ/mol. Further, the Nernst voltage for water spitting is decreased by 33 mV.

When a cell is operated at the high temperature, a membrane dehydration problem may occur, and the membrane dehydration problem may drop proton conductivity and increase ohmic loss. Furthermore, the high temperature PEMWE has a relatively inferior cell stability resulting from high operating temperature, which may inevitably increase the stack replacement cost, and the increase in stack replacement cost is because among the Ti-based anode components, which have been widely applied for conventional PEMWE, a diffusion layer (DL), a bipolar plate (BP), and a nafion membrane are unstable at operation conditions of HT-PEMWE, and at high temperature, Ti is rapidly oxidized (FIG. 1A) and corroded at anodic condition (>1.0 V$_{SHE}$), and this process degrades the quality of the DL and BP. For this reason, there have been attempts to apply a protective coating such as Au, Pt, and Ta to the diffusion layer and the bipolar plate, but these attempts inevitably increase the initial capital cost (FIG. 1B). Further, even though the Ti bipolar plate or diffusion layer is protected by Pt, corrosion may occur when the Ti layer is not completely covered.

Therefore, there is a need for developing a material capable of solving the stability issue for PEMWE as a stable and cost-efficient material for a diffusion layer, a bipolar plate, and a membrane electrolyte.

REFERENCES OF THE RELATED ART

Non-Patent Documents (Non-Patent Document 1) B.-S. Lee, H.-Y. Park, I. Choi, M. K. Cho, H.-J. Kim, S. J. Yoo, D. Henkensmeier, J. Y. Kim, S. W. Nam, S. Park, K.-Y. Lee, J. H. Jang, J. Power Sources 309 (2016) 127-134.
(Non-Patent Document 2) B.-S. Lee, S. H. Ahn, H.-Y. Park, I. Choi, S. J. Yoo, H.-J. Kim, D. Henkensmeier, J. Y. Kim, S. Park, S. W. Nam, K.-Y. Lee, J. H. Jang, Appl. Catal. B., 179 (2015) 285-291.
(Non-Patent Document 3) A. Skulimowska, M. Dupont, M. Zaton, S. Sunde, L. Merlo, D. J. Jones, J. Roziere, Int. J. Hydrogen Energy 39 (2014) 6307-6316.
(Non-Patent Document 4) V. Antonucci, A. Di Blasi, V. Baglio, R. Ornelas, F. Matteucci, J. Ledesma-Garcia, L. G. Arriaga, A. S. Arico, Electrochim. Acta 53 (2008) 7350-7356.
(Non-Patent Document 5) V. Baglio, R. Ornelas, F. Matteucci, F. Martina, G. Ciccarella, I. Zama, L. G. Arriaga, V. Antonucci, A. S. Arico, Fuel Cells 9 (2009) 247-252.
(Non-Patent Document 6) D. Aili, M. K. Hansen, C. Pan, Q. Li, E. Christensen, J. O. Jensen, N. J. Bjerrum, Int. J. Hydrogen Energy 36 (2011) 6985-6993.
(Non-Patent Document 7) W. Xu, K. Scott, S. Basu, J. Power Sources 196 (2011) 8918-8924.
(Non-Patent Document 8) M. K. Hansen, D. Aili, E. Christensen, C. Pan, S. Eriksen, J. O. Jensen, J. H. von Barner, Q. Li, N. J. Bjerrum, Int. J. Hydrogen Energy 37 (2012) 10992-11000.
(Non-Patent Document 9) P. Mazur, J. Polonsky, M. Paidar, K. Bouzek, Int. J. Hydrogen Energy 37 (2012) 12081-12088.
(Non-Patent Document 10) V. Natarajan, S. Basu, K. Scott, Int. J. Hydrogen Energy 38 (2013) 16623-16630.
(Non-Patent Document 11) H. Li, T. Fujigaya, H. Nakajima, A. Inada, K. Ito, J. Power Sources 332 (2016) 16-23.
(Non-Patent Document 12) H. Li, A. Inada, T. Fujigaya, H. Nakajima, K. Sasaki, K. Ito, J. Power Sources 318 (2016) 192-199.
(Non-Patent Document 13) J. Mali, P. Mazur, M. Paidar, T. Bystron, K. Bouzek, Int. J. Hydrogen Energy 41 (2016) 2177-2188.

SUMMARY

In an aspect, the present disclosure is directed to providing an $IrO_2$ electrodeposited porous titanium composite layer of a polymer electrolyte membrane water electrolysis apparatus. In the composite layer serving as both a diffusion layer and an oxygen electrode, the electrodeposited $IrO_2$ film plays a dual role of a catalyst layer for the oxygen evolution reaction (OER) and a corrosion-protection layer that prevents oxidation of the inner Titanium.

In another aspect, the present disclosure is directed to an apparatus having low $IrO_2$ loading amount and high stability.

In further another aspect, the present disclosure is directed to providing a polymer electrolyte membrane water electrolysis apparatus including the composite layer of the polymer electrolyte membrane water electrolysis apparatus.

In embodiments, the present disclosure provides an $IrO_2$ electrodeposited porous titanium composite layer of a polymer electrolyte membrane water electrolysis apparatus serving as both a diffusion layer and an oxygen electrode, the apparatus including: a porous titanium (Ti) layer; and an electrodeposited iridium oxide ($IrO_2$) layer on the porous Ti layer.

In an exemplary embodiment, the porous Ti layer may include one or more selected from a group consisting of Ti layers in a form of titanium paper and mesh.

In another exemplary embodiment, the $IrO_2$ layer may include iridium oxide loaded at 0.01 to 1.05 $mg/cm^2$ onto the porous Ti layer.

In another exemplary embodiment, the $IrO_2$ layer may include iridium oxide loaded at 0.1 to 0.5 $mg/cm^2$ onto the porous Ti layer.

In another exemplary embodiment, the $IrO_2$ layer may be uniformly deposited on the porous Ti layer, and thus may physically block the porous Ti layer from the external oxidative environment.

In another exemplary embodiment, the $IrO_2$ layer may have a thickness of 10 to 210 nm.

In another exemplary embodiment, the $IrO_2$ layer may include amorphous iridium oxide.

In another aspect, the present disclosure provides a method for preparing an $IrO_2$ electrodeposited porous titanium composite layer of a polymer electrolyte membrane water electrolysis apparatus serving as both a diffusion layer and an oxygen electrode, the method including: electrodepositing an iridium oxide ($IrO_2$) layer on a porous titanium (Ti) layer.

In an exemplary embodiment, the porous Ti layer may include one or more selected from a group consisting of Ti layers in a form of titanium paper and mesh.

In another exemplary embodiment, the electrodeposition may be performed at a deposition potential of 0.5 to 0.9 $V_{SCE}$.

In another exemplary embodiment, the electrodeposition may be performed for 1 min or more and less than 10 min.

In another exemplary embodiment, the electrodeposition may be performed for 3 min or more and 8 min or less.

In still another aspect, the present disclosure provides a polymer electrolyte membrane water electrolysis apparatus including the $IrO_2$ electrodeposited porous titanium composite layer of the polymer electrolyte membrane water electrolysis apparatus.

In an exemplary embodiment, the polymer electrolyte membrane water electrolysis apparatus may exhibit a current density of 0.07 to 0.96 $A/cm^2$ at 1.6 V and 120° C.

In an exemplary embodiment, the polymer electrolyte membrane water electrolysis apparatus may exhibit a current density of 0.16 to 0.96 $A/cm^2$.

In an exemplary embodiment, the polymer electrolyte membrane water electrolysis apparatus may be a high-temperature polymer electrolyte membrane water electrolysis apparatus which is operated at 200° C. or less.

In an exemplary embodiment, the polymer electrolyte membrane water electrolysis apparatus may be a high-temperature polymer electrolyte membrane water electrolysis apparatus which is operated at 60° C. or more.

A composite layer of a polymer electrolyte membrane water electrolysis apparatus according to embodiments of the present disclosure may include an electrodeposited iridium oxide ($IrO_2$) layer on a porous titanium (Ti) layer. Herein, the electrodeposited $IrO_2$ layer physically blocks Ti on the Ti layer, and thus may contribute to the prevention of a porous Ti layer from corrosion, and may also function as a catalyst for an oxygen evolution reaction (OER). In the present disclosure, a porous Ti layer, more specifically, a Ti layer in a form of titanium paper or mesh is used, and in this case, iridium oxide may be more uniformly deposited, and thus may more effectively prevent the Ti layer from corrosion. Accordingly, the performance of a polymer electrolyte membrane water electrolysis apparatus including the same may be significantly increased, and particularly, the anode may exhibit high performance (for example, 0.97 A/cm$^2$ at 1.6 V and 120° C.) despite low IrO$_2$ loading amount (0.4 mg/cm$^2$), which is comparable to conventional anodes (when a catalyst is loaded at 0.8 to 5 mg/cm$^3$).

Furthermore, the composite layer of the polymer electrolyte membrane water electrolysis apparatus according to embodiments of the present disclosure may exhibit excellent durability even at 120° C. and 1.72 V (voltage efficiency: 85%) when applied to a cell, so that the composite layer may be applied to a polymer electrolyte membrane water electrolysis apparatus which is operated at a high temperature of, for example, 200° C. or less. Therefore, the composite layer of the polymer electrolyte membrane water electrolysis apparatus may be used without corrosion for a long period of time by using a high-temperature polymer electrolyte membrane water electrolysis apparatus.

In summary, the composite layer according to embodiments of the present disclosure may exhibit high performance despite low IrO$_2$ loading amount, which is comparable to conventional composite layers, and has excellent durability, and thus may be widely used.

DETAILED DESCRIPTION

Figure 1A:
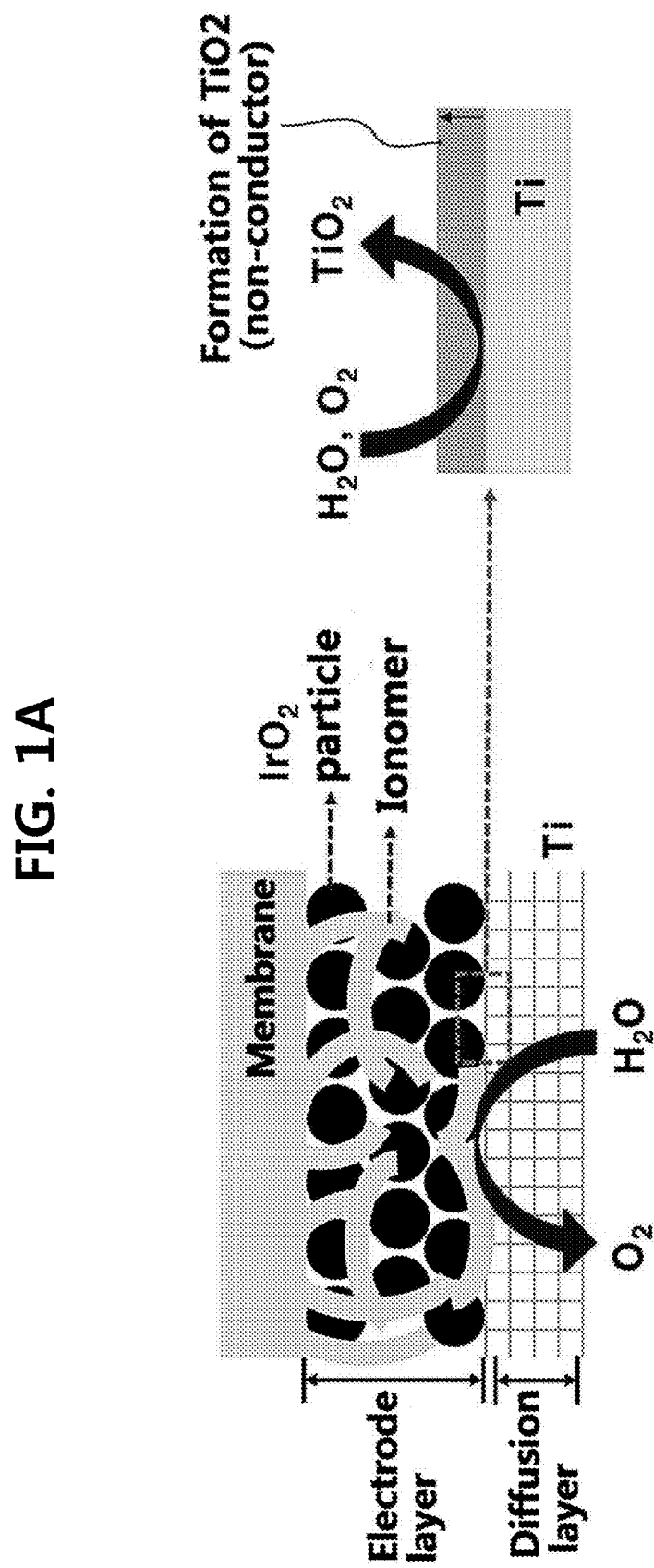
FIGS. 1A and 1B show an anode for a polymer electrolyte membrane water electrolysis apparatus according to the related art.
Figure 1B:
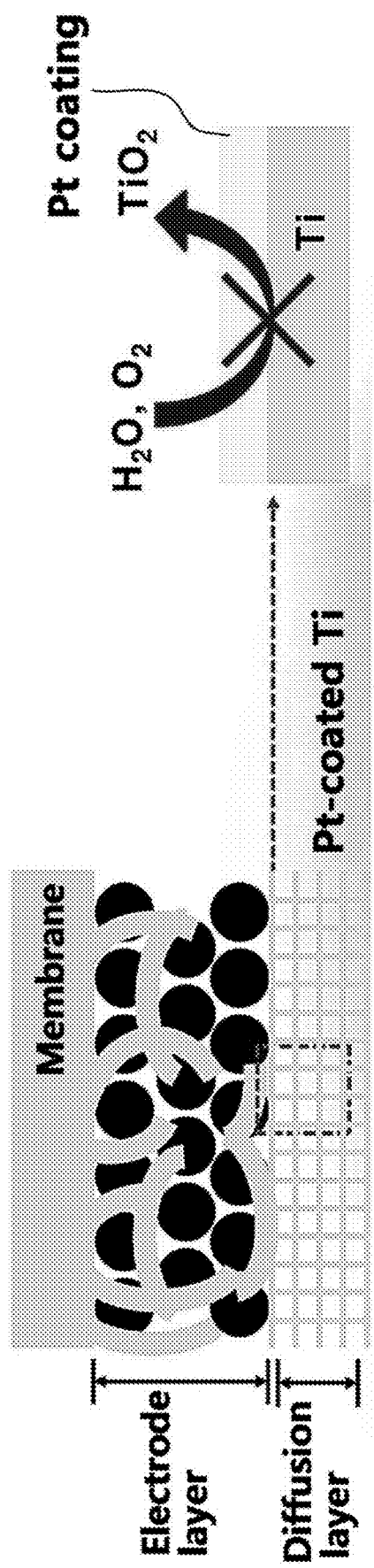
Figure 2:
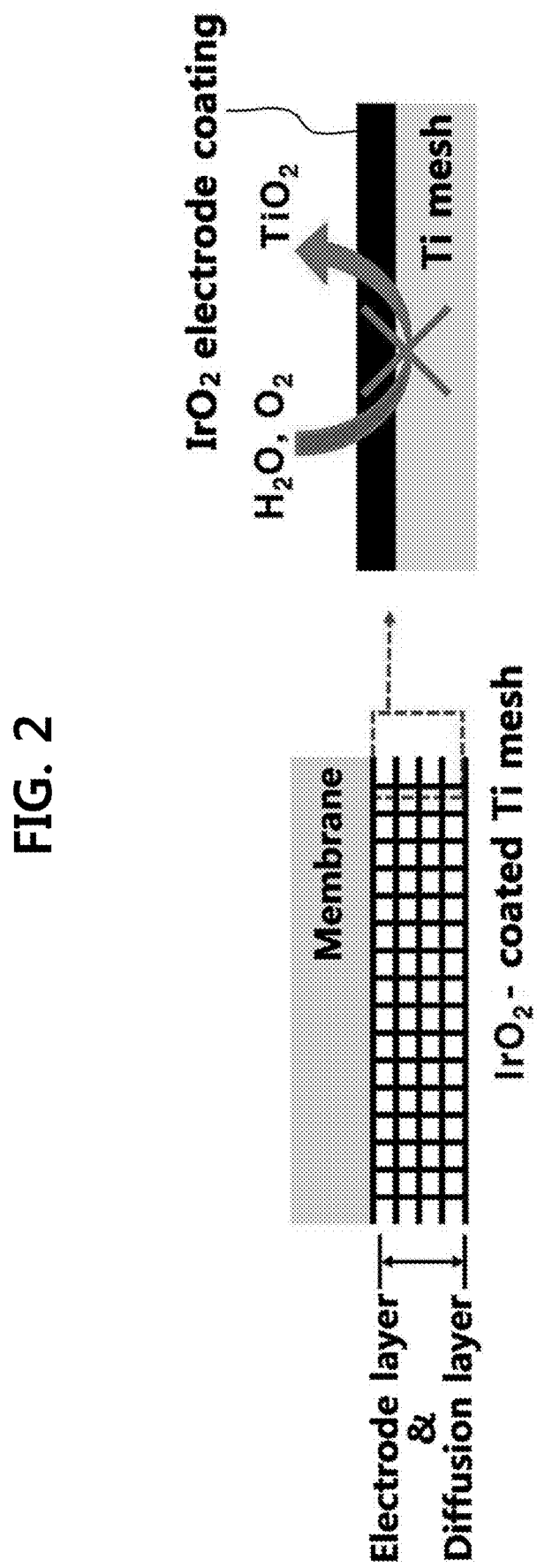
FIG. 2 shows a diffusion layer and an oxygen electrode composite layer for a polymer electrolyte membrane water electrolysis apparatus according to the present disclosure.

Hereinafter, embodiments of the present disclosure will be described in detail with reference to accompanying drawings. Embodiments of the present disclosure have been described with reference to accompanying drawings, but have been described for illustration, and the technical spirit of the present disclosure and the configuration and application thereof are not limited thereby.

DEFINITION OF TERMS

In the present specification, the term 'titanium layer in a form of mesh' refers to a porous titanium layer having a shape such as a network. The network pore may have, for example, a polygonal or circular structure.

In the present specification, the term 'titanium paper' refers to a substrate in the form of paper formed by closely weaving cylindrical or polygonal drum-like titanium (Ti) fiber. The titanium fiber may have a cross-sectional area of 50 to 10,000 μm$^2$.

IrO$_2$ Electrodeposited Porous Titanium Composite Layer of Polymer Electrolyte Membrane Water Electrolysis Apparatus The present disclosure provides an IrO$_2$ electrodeposited porous titanium composite layer of a polymer electrolyte membrane water electrolysis apparatus serving as both a diffusion layer and an oxygen electrode, the apparatus including: a porous titanium (Ti) layer; and an electrodeposited iridium oxide (IrO$_2$) layer on the porous Ti layer. In the composite layer, an electrodeposited IrO$_2$ layer may function as a corrosion-protection layer which prevents an inner Ti layer from corrosion and a catalyst layer toward OER. Furthermore, the electrodeposited IrO$_2$ layer may function as an electrode layer along with the Ti layer. Accordingly, the inner porous Ti layer may not be corroded from anodic oxidation, and thus, may exhibit excellent durability even when the composite layer is used for a high-temperature polymer electrolyte membrane water electrolysis apparatus which is operated at high temperature (for example, about 200° C. or less). Furthermore, the IrO$_2$ is coated on the Ti layer through an electrodeposition process, and in this case, the IrO$_2$ may exhibit excellent effect even though the loading amount is small (that is, the mass activity is excellent). Accordingly, the durability of Ti may be more improved, and the OER may be more effectively increased by a small IrO$_2$ loading amount.

In an exemplary embodiment, a porous Ti layer may be used because titanium exhibits strong durability under high-temperature polymer water electrolysis conditions due to high oxidation resistance and corrosion resistance as compared to a material such as carbon or copper which is a conductive material, and is competitive in terms of price as compared to gold, platinum, and the like, and thus, the porous Ti layer is preferred. In addition, when the porous Ti layer is used, IrO$_2$ may be more smoothly coated.

Specifically, the porous Ti layer may include a plurality of pores. In an aspect, the porous Ti layer may have a porosity of about 50% to about 80%, preferably about 60% to about 70%.

In an exemplary embodiment, the porous Ti layer may include one or more selected from a group consisting of Ti layers in a form of titanium paper and mesh.

In an aspect, the Ti layer may be a Ti layer in the form of mesh, and when the Ti layer has a mesh shape as described above, a deposition process may be uniformly performed as compared to titanium paper, and the like, during the deposition of the $IrO_2$ layer on the Ti layer. Accordingly, an effect such as prevention of the Ti layer from corrosion may be more enhanced.

In an exemplary embodiment, the Ti layer may have a thickness of 50 nm to 1,000 nm, and may have a thickness of specifically 100 nm to 500 nm. When the Ti layer has a thickness of less than 50 nm, physical stability may deteriorate, and when the Ti layer has a thickness of more than 1,000 nm, performance drop per catalyst amount may occur due to problems such as reduction in mass transfer at anode and an increase in amount of catalyst ($IrO_2$) required.

In an exemplary embodiment, the Ti layer may have an active area of 1 to 100 $cm^2$.

Meanwhile, in the present disclosure, the $IrO_2$ layer is a coating layer which is coated on the Ti layer, and may function as an electrode layer of oxygen reaction.

In an exemplary embodiment, the $IrO_2$ layer is electrodeposited on the Ti layer, and when the $IrO_2$ layer is electrodeposited, a dense coating thin film is formed on the Ti surface unlike the case when other preparation methods for loading an $IrO_2$ catalyst (for example, a spraying method or a decal method, and the like) are used on the corresponding Ti layer. The $IrO_2$ coating layer may also serve as an oxidation prevention film which prevents the inner Ti layer from corrosion unlike the case of using other conventional methods, which use only $IrO_2$ as a catalyst.

In an aspect, a diffusion layer and an oxygen electrode composite layer of an electrolyte membrane water electrolysis apparatus may be expressed as a structure in which the surface of the porous Ti layer is covered with an $IrO_2$ layer and $IrO_2$ particles are deposited onto the corresponding $IrO_2$ layer.

In an exemplary embodiment, the $IrO_2$ layer covers the surface of the porous Ti layer, and it is preferred that the $IrO_2$ layer has a crack-free structure.

That is, a preferred composite layer structure is a crack-free structure in which the $IrO_2$ layer covers the surface of the porous Ti layer, and the $IrO_2$ layer does not have cracks, and a more preferred composite layer structure is a crack-free structure in which the $IrO_2$ layer covers the surface of a Ti layer in the form of mesh, and the $IrO_2$ layer does not have cracks.

In another exemplary embodiment, the $IrO_2$ layer may include amorphous iridium oxide. In this case, the iridium oxide included in the $IrO_2$ layer may exhibit a density of 10 $g/cm^3$ or less, and specifically 7 to 9 $g/cm^3$.

In another exemplary embodiment, the $IrO_2$ layer may have a thickness of 10 to 210 nm, preferably 140 to 210 nm. When the $IrO_2$ layer has a thickness of less than 10 nm, the inner titanium corrosion prevention capability may be significantly decreased, and when the $IrO_2$ layer has a thickness of more than 210 nm, cracks are generated inside thereof, and as a result, the corrosion prevention capability may be decreased.

Meanwhile, in the present disclosure, the $IrO_2$ layer may exhibit an effect which is the same as or more improved than that of a conventional anode even though a small amount of $IrO_2$ is loaded onto the Ti layer. For example, even though $IrO_2$ at 0.01 to 1.05 $mg/cm^2$, specifically, 0.1 to 0.5 $mg/cm^2$ is loaded onto the Ti layer, it is possible to exhibit an effect which is the same as or more improved than that of an anode of a conventional polymer electrolyte membrane water electrolysis apparatus.

Meanwhile, in another aspect, the present disclosure provides a method for preparing an $IrO_2$ electrodeposited porous Titanium composite layer of a polymer electrolyte membrane water electrolysis apparatus serving as both the diffusion layer and an oxygen electrode, the method including: electrodepositing an iridium oxide ($IrO_2$) layer on a porous titanium (Ti) layer.

In an exemplary embodiment, the electrodeposition may be proceeded at a deposition potential of 0.5 to 0.9 $V_{SCE}$, more specifically, 0.6 to 0.9 $V_{SCE}$. When the electrodeposition is performed at less than 0.5 $V_{SCE}$, a non-uniform coating layer may be formed because the deposition rate is very slow and the deposition is non-uniformly performed, and when the electrodeposition is performed at more than 0.9 V, the deposition efficiency is not excellent, and as a result, the range may not be preferred in terms of economic efficiency.

In an exemplary embodiment, the electrodeposition may be performed for 1 min or more and less than 10 min, preferably, 3 min or more and 8 min or less. When the electrodeposition is performed for less than 1 min, the $IrO_2$ layer may not completely cover the Ti layer, and when the electrodeposition is performed for more than 10 min, cracks may be produced on the $IrO_2$ layer.

Meanwhile, in another aspect, the present disclosure provides a polymer electrolyte membrane water electrolysis apparatus including a polymer electrolyte membrane, a cathode formed at one side of the membrane, and an anode formed at the other side of the membrane, in which the anode includes the composite layer.

In an exemplary embodiment, a membrane electrode assembly is prepared by forming a composite layer including a porous Ti layer in which the $IrO_2$ layer is electrodeposited at one side of a polymer electrolyte membrane (for example, a nafion membrane), and forming a cathode (a commercial cathode may be used, and for example, Pt/C formed by spraying platinum onto carbon paper may be used) at the other side thereof, and thus, a polymer electrolyte membrane water electrolysis apparatus (cell) may be prepared by assembling a bipolar plate with the membrane electrode assembly and mounting an end plate thereto.

In an exemplary embodiment, the polymer electrolyte membrane water electrolysis apparatus may achieve high performance even in a small catalyst amount (small $IrO_2$ loading amount). For example, when the $IrO_2$ loading amount is 0.01 to 1.05 $mg/cm^2$, it is possible to exhibit a current density of 0.07 $A\,cm^{-2}$ to 0.96 $A\,cm^{-2}$ at 1.6 V, 120° C., and 1.0 to 700 bar (or, for example, 1.0 to 50 bar, or 1.0 to 30 bar, 1.0 to 2.5 bar), and in this case, as the cathode and the membrane, it is possible to use a typical cathode (for example, Pt/C: the cathode catalyst amount may also be a typical catalyst amount, for example, 0.4 $mg/cm^2$) and a typical membrane (nafion).

In an aspect, when the $IrO_2$ loading amount is 0.1 to 0.5 $mg/cm^2$, the polymer electrolyte membrane water electrolysis apparatus may exhibit a current density of 0.16 to 0.96 A $cm^{-2}$ under the same conditions as described above.

Meanwhile, the polymer electrolyte membrane water electrolysis apparatus showed stability under a high-temperature water electrolysis condition (200° C. or less), and showed a degradation rate of about 0.1%/hr to about 0.2%/hr under the conditions of, for example, 1 V to 3 V, 100° C. to 120° C., and 1 bar to 3 bar.

In an exemplary embodiment, it could be confirmed that the polymer electrolyte membrane water electrolysis apparatus showed a degradation rate of about 0.11%/hr at 1.72 V, 120° C., and 2.5 bar.

As described above, the features of aspects of the present disclosure, particularly, characteristics for the electrode stability may be clearly exhibited at high temperature (a temperature of 200° C. or less). The reason is because among the Ti-based anode components which are widely applied to conventional PEMWE, the diffusion layer (DL), the bipolar plate (BP), and the nafion membrane are unstable under the operating conditions of the high-temperature polymer electrolyte membrane water electrolysis apparatus (HT-PEMWE), Ti is more rapidly oxidized particularly at high temperature ($T \leq 200°$ C.) and thus is corroded under anodic conditions, and the procedure degrades the quality of DL and BP. In contrast, according to the present disclosure, since an electrodeposited $IrO_2$ layer, which serves both as a catalyst layer and a corrosion-protection layer in a composite layer, perfectly physically blocks a porous Ti layer, the oxidation of the Ti layer may be reduced, thereby solving a problem in that the performance of the electrode deteriorates. Accordingly, a high-temperature polymer electrolyte membrane water electrolysis apparatus may be stably operated for a long period of time, and hydrogen may be produced with high efficiency.

In an exemplary embodiment, a polymer electrolyte membrane water electrolysis apparatus including the composite layer may be a high-temperature polymer electrolyte membrane water electrolysis apparatus which is implemented at a temperature of, specifically, 200° C. or less, specifically, at a temperature of 60 to 200° C.

In an aspect, a polymer electrolyte membrane water electrolysis apparatus including the composite layer may be implemented at a temperature of 60 to 150° C., or at a temperature of 100 to 150° C.

In an aspect, a polymer electrolyte membrane water electrolysis apparatus including the composite layer may be implemented at a temperature of 60 to 120° C.

Further, in another aspect, the present disclosure provides a polymer electrolyte membrane water electrolysis method using the polymer electrolyte membrane water electrolysis apparatus.

Hereinafter, the present disclosure will be described in more detail through Examples. These Examples are only for exemplifying the present disclosure, and it will be obvious to those skilled in the art that the scope of the present disclosure is not interpreted to be limited by these Examples.

EXAMPLES

Hereinafter, the present disclosure will be described in detail through an example and test examples. However, the following example and test examples are for illustrative purposes only and it will be apparent to those of ordinary skill in the art that the scope of the present disclosure is not limited by them.

(1) Preparation of Anode

An oxygen electrode (anode) was prepared by performing electrodeposition or spraying processes on two kinds of diffusion layers (Ti and carbon paper (CP)). A solution consisting of 10 mM iridium chloride hydrate ($IrCl_4 \cdot H_2O$), 100 mM hydrogen peroxide $H_2O_2$, 40 mM oxalic acid ($COOH_2 \cdot 2H_2O$), and 340 mM potassium carbonate ($KCO_3$) was prepared as an electrodeposition solution.

First, a Ti mesh (Ti gauze 80 mesh, alpha aeaser) substrate was preliminary immersed into 5 wt % oxalic acid (60° C.) for 30 min for removal of native oxide ($TiO_2$). On the Ti mesh substrate, an e-$IrO_2$/Ti electrode was prepared via electrodeposition with various deposition potentials ($E_{dep}$, 0.5 to 0.8 $V_{SCE}$) and deposition times ($t_{dep}$, 1 to 20 min) at room temperature. At this time, a Ti mesh with an active area of 32 $cm^2$ and a standard calomel electrode (SCE) were employed as counter and reference electrodes, respectively.

For comparison, the e-$IrO_2$/CP electrode was prepared by electrodepositing $IrO_2$ ($E_{dep}$=0.7 V and $t_{dep}$=10 min) on carbon paper (TGPH-090, Toray) without any pretreatment. All processes were carried out with potentiostat equipment (AUT302N, AUTO LAB Ltd.).

Meanwhile, an s-$IrO_2$/Ti electrode was prepared by spraying a catalyst ink ($IrO_2 \cdot 2H_2O$ (Alfa Aesar), a 5 wt % nafion solution (DuPont Co.), deionized water and isopropyl alcohol with a weight ratio of 7:60:42:168 during the spraying process. At this time, an $IrO_2$ loading amount and a nafion content were controlled to 1.0 mg/$cm^2$ and 30 wt %, respectively.

(2) Preparation of HT-PEMWE Single Cell

A single cell was fabricated by assembling a cathode end plate, a graphite anode plate, a hydrogen electrode (exposed area: 6.25 $cm^2$), a nafion membrane (NR-212, Dupont), an oxygen electrode, an Au/Ti bipolar plate (BP), and an anode end plate. The hydrogen electrode was prepared by spraying a catalyst ink (46.5 wt % Pt/C (TKK)), a 5 wt % nafion solution, deionized water and isopropyl alcohol into commercial carbon paper (39BC, SGL carbon). At this time, the Pt loading amount and the nafion content were controlled to 0.4 mg/$cm^2$ and 30 wt %, respectively.

Measurement Equipment

Surface morphology and $IrO_2$ distribution at the substrate were examined with field emission scanning electron microscopy (Inspect F50, Field emission Inc.) and electron probe micro analysis (EPMA, JXA-8500F, JEOL). Focused ion beam (FIB, Nova 600, FEI) was used to observe the cross-sections of prepared samples. Before FIB was used, the Pt layer was preliminarily deposited onto the sample using a sputtering process for protecting the inner sample. The X-ray photoelectron spectroscopy (XPS, PHI 5000 VersaProbe, Ulvac-PHI Ltd.) using Al Kα (1486.6 eV) radiation and inductively coupled plasma mass spectroscopy (ICP-MS, iCAP 6300 series, Thermo Ltd.) was used to analyze the oxidation state of Ir and the adsorption amount of $IrO_2$.

The corrosion behavior of the diffusion layer (DL) was examined using linear sweep voltammetry analysis with a scan rate of 1 mV/s and a potential range of –0.8 to 1.0 $V_{SCE}$, and an analysis was performed in a 0.5 M $H_2SO_4$ solution at 25° C.

Furthermore, for the single cell, with inflowing deionized water (15 mL/min) into the anode, iV curve and EIS spectrum were obtained by using potentiostat (HCP-803, biologic) at 120° C. and 2.5 bar (for both anode and cathode). For obtaining iV curves, the voltages were sequentially applied from 1.35 V to 2.0 V at a predetermined voltage interval of 0.05 V. For each voltage, a mean current density was obtained for 60 sec. The EIS measurement was conducted at a DC potential of 1.72 V and an AC frequency of 50 kHz to 50 mHz. A degradation experiment was carried out with a constant voltage of 1.72 V (voltage efficiency: 85%) at 150° C. and 2.5 bar.

Results and Discussion

Figure 3:
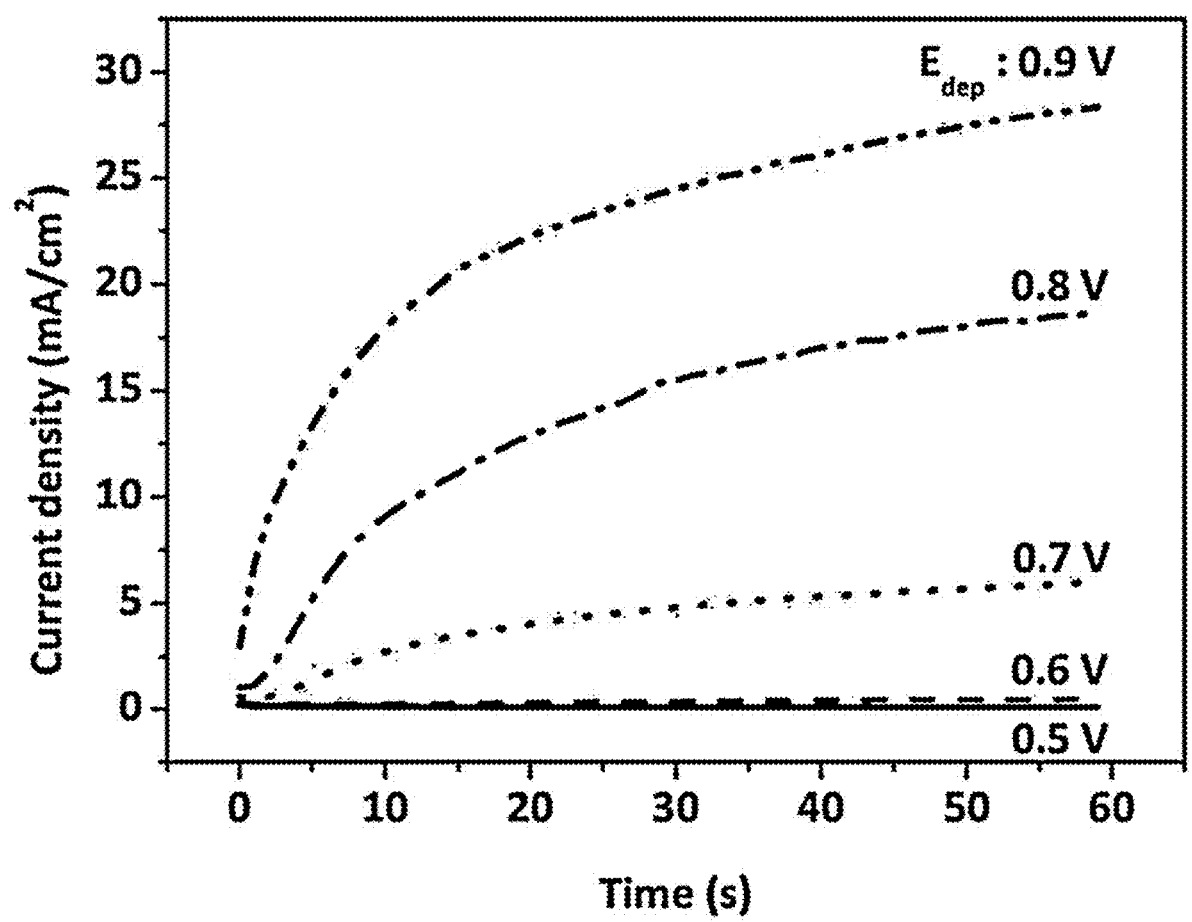
FIG. 3 shows the current profile during IrO$_2$ electrodeposition under E$_{dep}$ conditions of 0.5, 0.6, 0.7, 0.8, and 0.9 V$_{SCE}$.

Confirmation of Current Flow of Anode According to Deposition Time and Deposition Amount An anodic electrodeposition process of $IrO_2$ on a Ti mesh was conducted under a condition of $E_{dep}$ of 0.5 to 0.9 $V_{SCE}$, and the current profile during $IrO_2$ electrodeposition is shown in FIG. 3. Referring to FIG. 3, the current density was quite low at 0.5 $V_{SCE}$ and 0.6 $V_{SCE}$. However, when $E_{dep}$ was increased to 0.7 to 0.9 $V_{SCE}$, the current became observable, and this current flow is determined to be a result of the oxidation reaction of $[Ir(COO)_2(OH)_4]^{2-}$ complex with $IrO_2$. At 0.7 to 0.9 $V_{SCE}$, the current sharply grew at the initial stage of electrodeposition, but the growth became slow down after few seconds, and the initial increase in current is determined to be because the OER was more efficiently catalyzed by deposited e-$IrO_2$ than the inner Ti substrate.

Figure 4A:
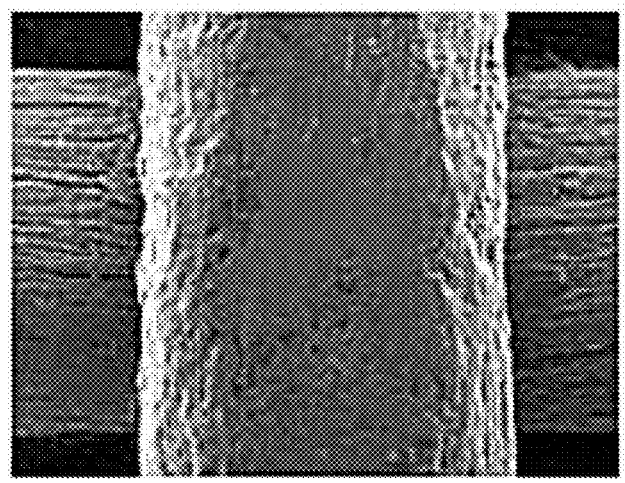
FIGS. 4A to 4E show the surfaces of pristine Ti mesh and iridium oxide-deposited Ti mesh (e-TiO$_2$/Ti), respectively (FIG. 4A: pristine Ti mesh, FIGS. 4B to 4E: iridium oxide-deposited Ti mesh under conditions of 0.6 V$_{SCE}$ (FIG. 4B), 0.7 V$_{SCE}$ (FIG. 4C), 0.8 V$_{SCE}$ (FIG. 4D), and 0.9 V$_{SCE}$ (FIG. 4E) for 5 min). The corresponding EPMA mapping results for Ir are also shown below, respectively.
Figure 4B:
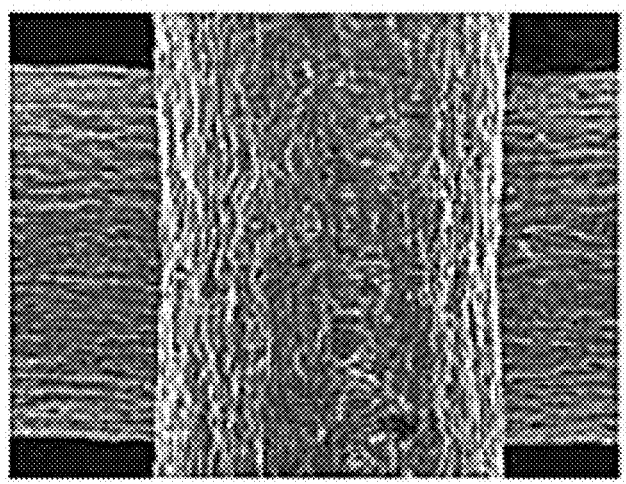
Figure 4B:
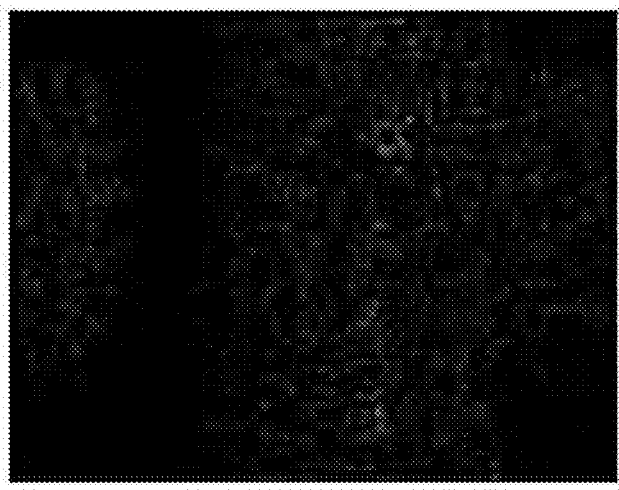
Figure 4C:
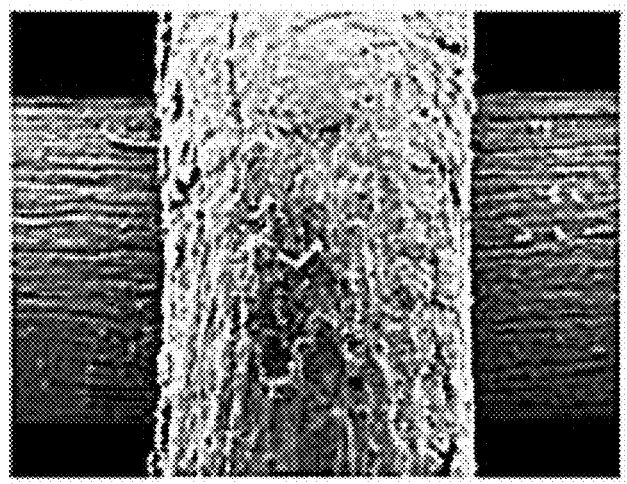
Figure 4C:
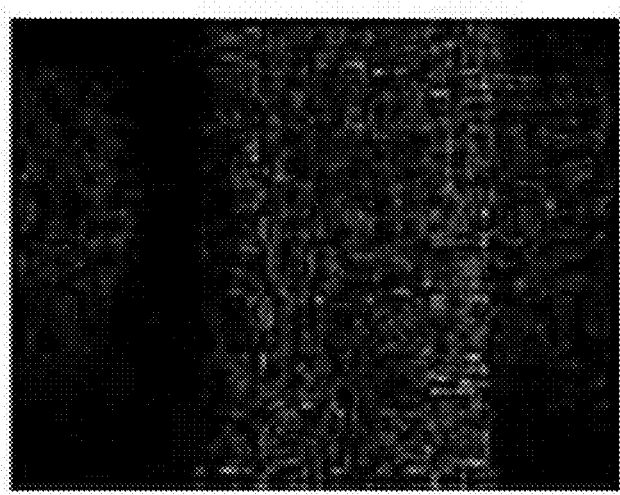
Figure 4D:
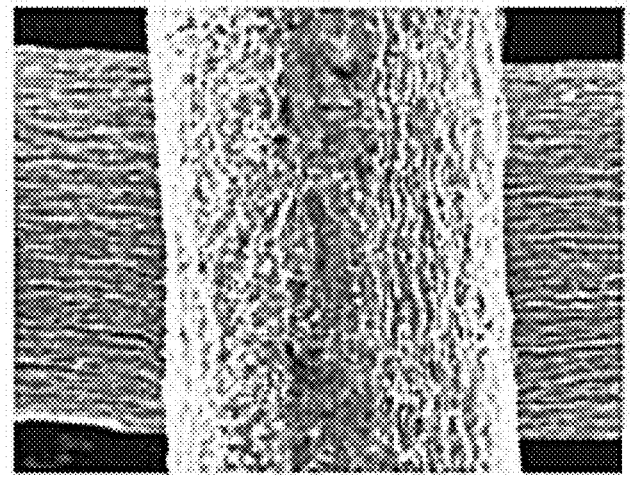
Figure 4D:
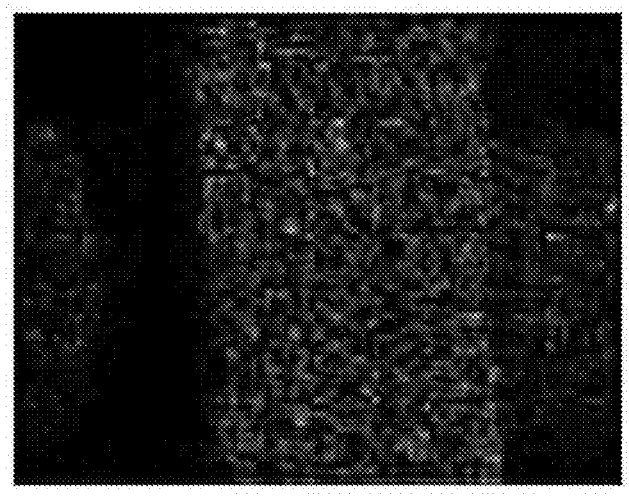
Figure 4E:
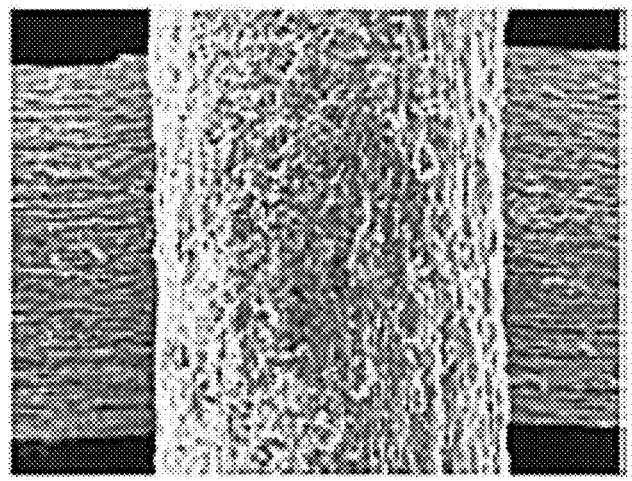
Figure 4E:
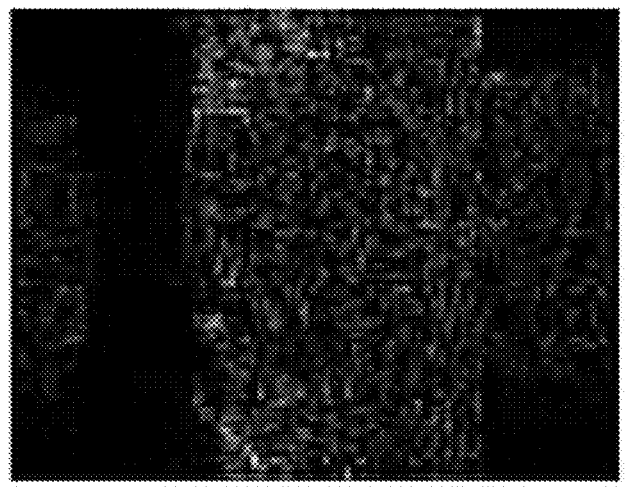

The surface morphologies and the corresponding EPMA mapping for electrodes with various $E_{dep}$ (0.6, 0.7, 0.8, and 0.9 $V_{SCE}$, $t_{dep}$: 5 min) are shown in FIGS. 4A to 4E (FIG. 4A: pristine Ti mesh, and FIGS. 4B to 4E: iridium oxide-deposited Ti meshes under conditions of 0.6 $V_{SCE}$ (FIG. 4B), 0.7 $V_{SCE}$ (FIG. 4C), 0.8 $V_{SCE}$ (FIG. 4D), and 0.9 $V_{SCE}$ (FIG. 4E) for 5 min, respectively). Referring to this, as in FIG. 3, it could be confirmed that even at $E_{dep}$ of 0.6 $V_{SCE}$ where the current density was quite low, a small amount of $IrO_2$ was precipitated on the Ti surface. Meanwhile, when $E_{dep}$ was increased to 0.7 $V_{SCE}$, the deposition amount was increased, and the Ti surface seemed to be fully covered with $IrO_2$ film without any noticeable cracks (FIG. 4C), and at 0.8 $V_{SCE}$ and 0.9 $V_{SCE}$, $IrO_2$ is still uniformly applied on the Ti surface and an electrode detachment was not found on the e-$IrO_2$/CP electrode at high $E_{dep}$ ($E_{dep}$: 0.8 and 0.9 $V_{SCE}$). From the absence of $IrO_2$ separation at high $E_{dep}$, it could be confirmed that there was good adhesion between $IrO_2$ and Ti surface.

Meanwhile, though the higher $E_{dep}$ led to higher deposition current density (FIG. 3), the deposition amount of $IrO_2$ was not varied between 0.7 and 0.9 $V_{SCE}$. As described above, the current efficiency for $IrO_2$ deposition at 0.8 $V_{SCE}$ and 0.9 $V_{SCE}$ was low, and therefore, the experiment was carried out only at 0.7 $V_{SCE}$.

Figure 5:
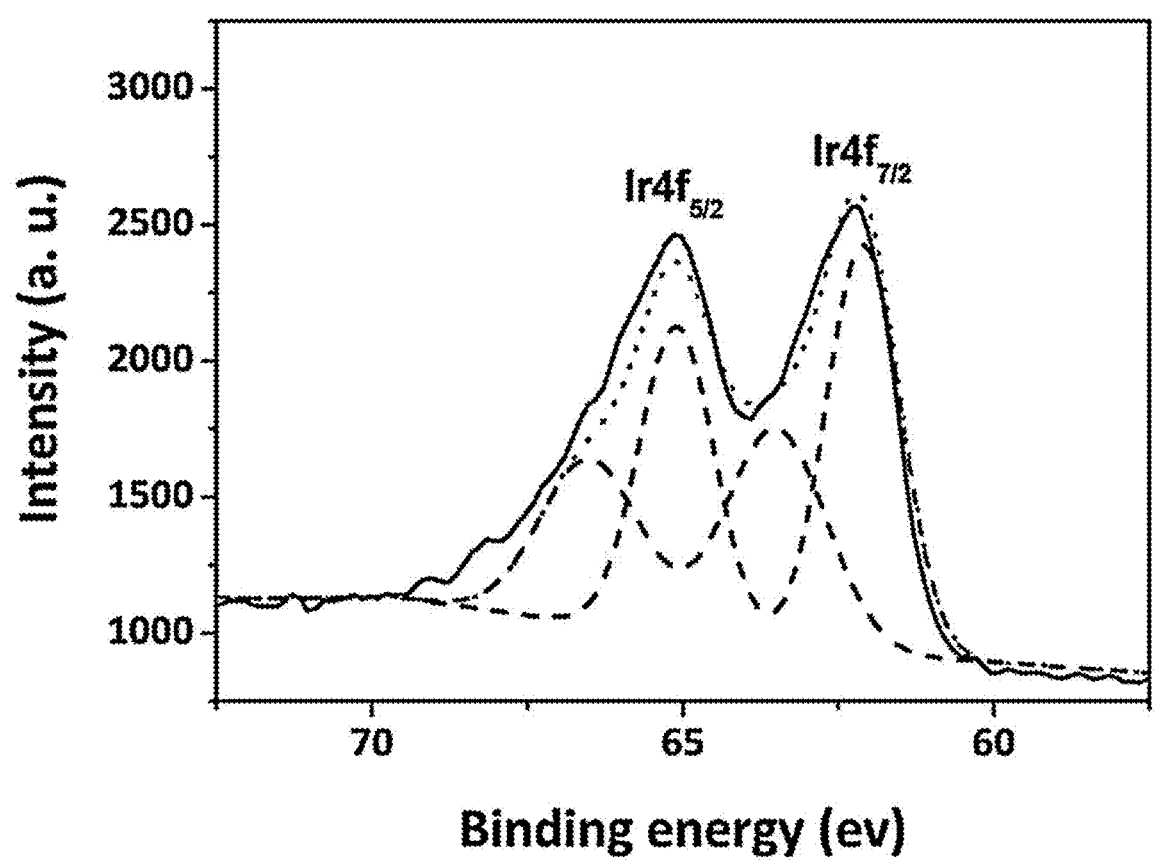
FIG. 5 is XPS spectra for e-IrO$_2$/Ti deposited under a condition of 0.7 V$_{SCE}$ for 5 min.

The oxidation state of electrodeposited Ir thin film on Ti ($E_{dep}$=0.7 $V_{SCE}$, $t_{dep}$=5 min) was confirmed with XPS analysis. In FIG. 5, two asymmetrical peaks related to Ir4f were observed at 65.1 eV ($4f_{5/2}$) and 62.2 eV ($4f_{7/2}$), which also seemed to be fitted with doublets. When each peak was deconvoluted into two peaks, the peaks with lower binding energies at 65.10 eV ($4f_{5/2}$) and 62.10 eV ($4f_{7/2}$) could be assigned to an $Ir^{4+}$ state, indicating the presence of $IrO_2$. The higher binding energy peaks at 66.55 eV ($4f_{5/2}$) and 63.55 eV ($4f_{7/2}$) can be originated from the unscreened components of the $Ir^{4+}$ state, and thus, it could be confirmed that the surface of precipitates was mainly composed of $IrO_2$.

Figure 6A:
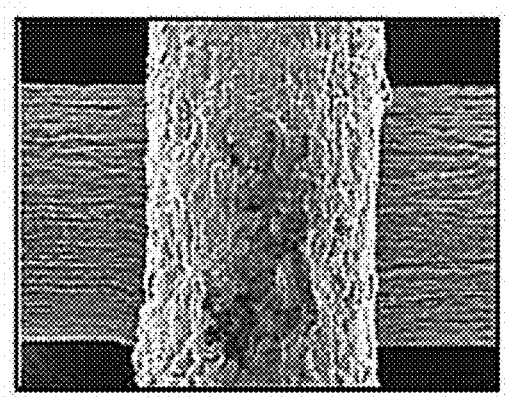
FIGS. 6A to 6E show surface changes during the preparation of e-IrO$_2$/Ti when time conditions are varied. At this time, t$_{dep}$ was controlled to 1 min (FIG. 6A), 3 min (FIG. 6B), 5 min (FIG. 6C), 10 min (FIG. 6D), and 20 min(FIG. 6E), and at this time, E$_{dep}$ was fixed at 0.7 V$_{SCE}$.
Figure 6A:
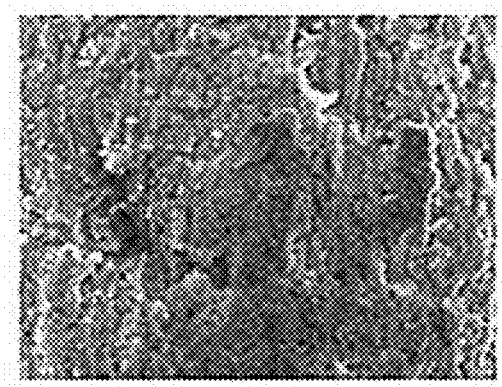
Figure 6B:
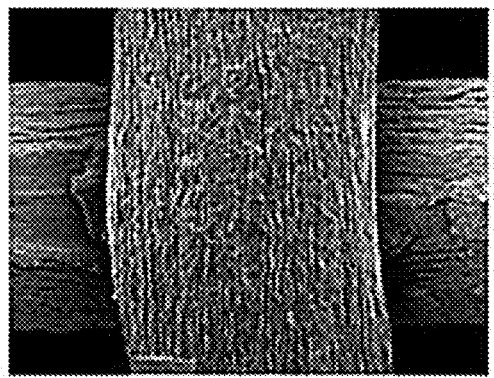
Figure 6B:
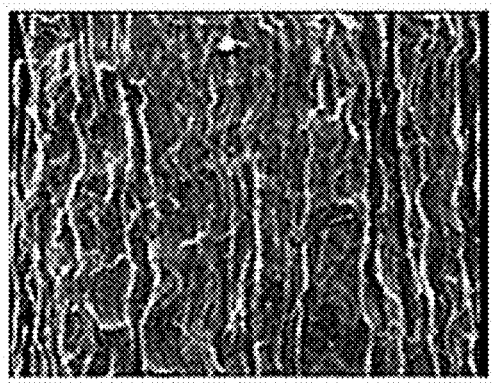
Figure 6C:
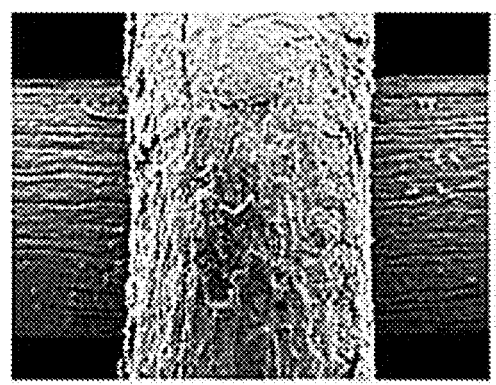
Figure 6C:
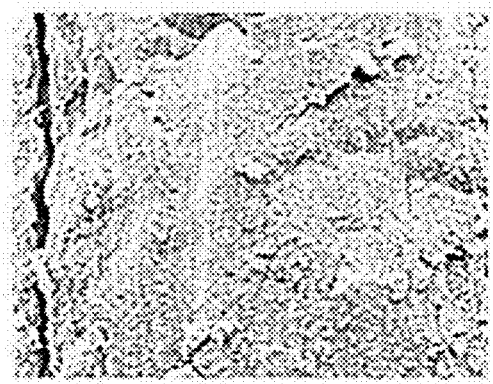
Figure 6D:
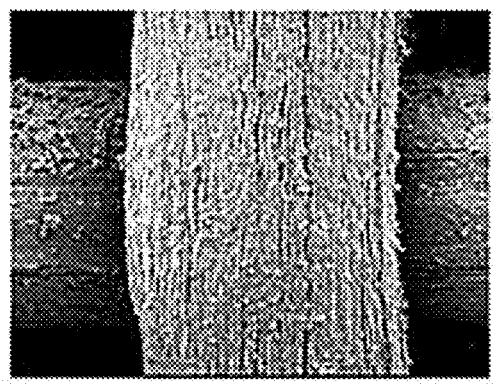
Figure 6D:
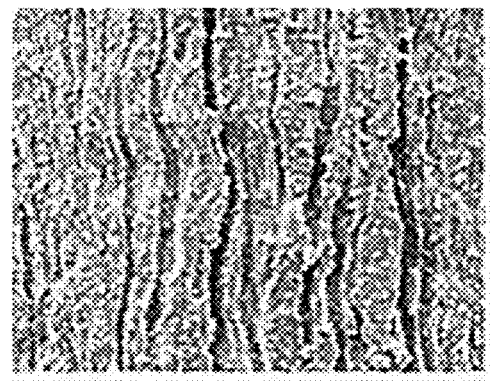
Figure 6E:
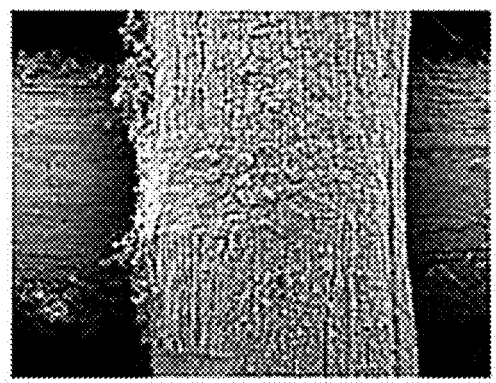
Figure 6E:
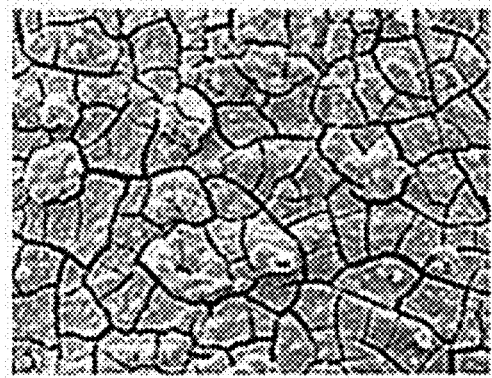
Figure 7A:
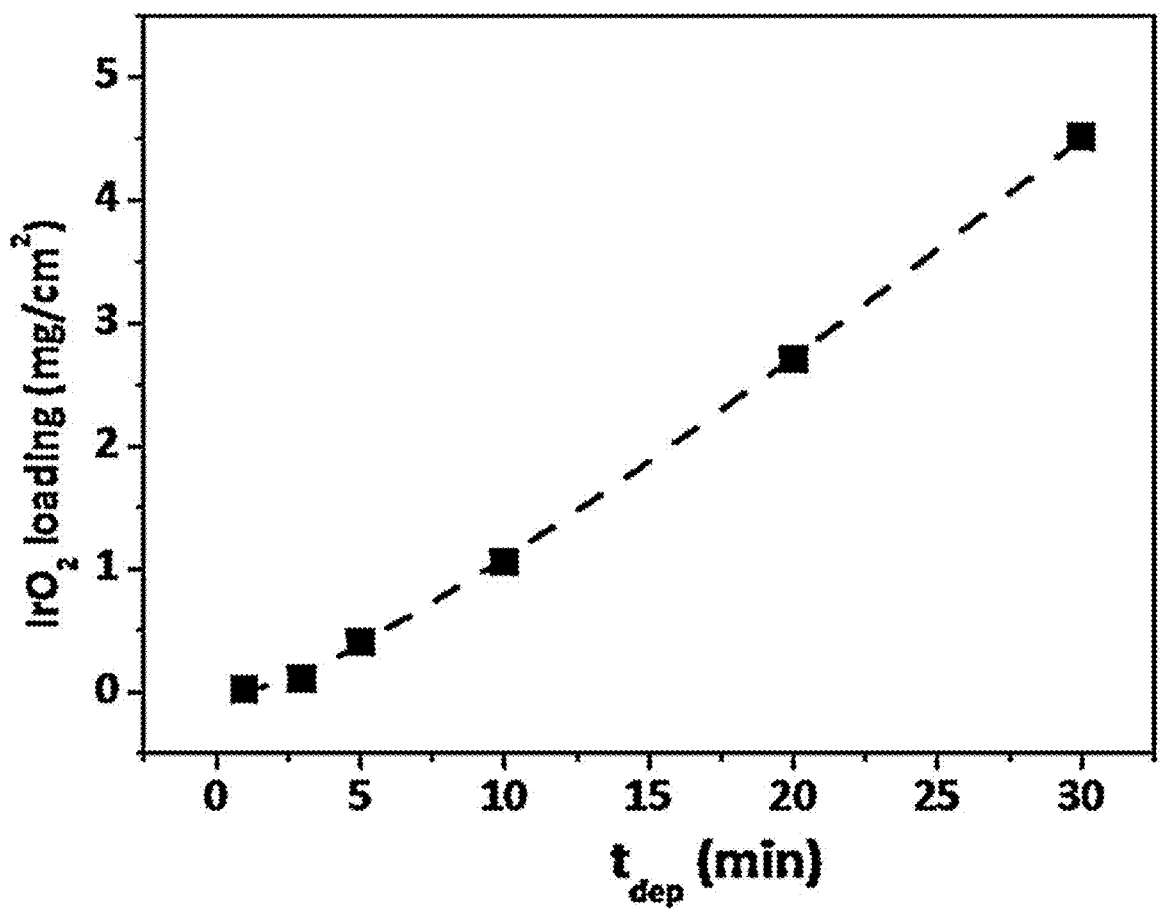
FIG. 7A is a graph showing IrO$_2$ loading amount as a function of t$_{dep}$ under the E$_{dep}$ condition fixed at 0.7 V$_{SCE}$.
Figure 7B:
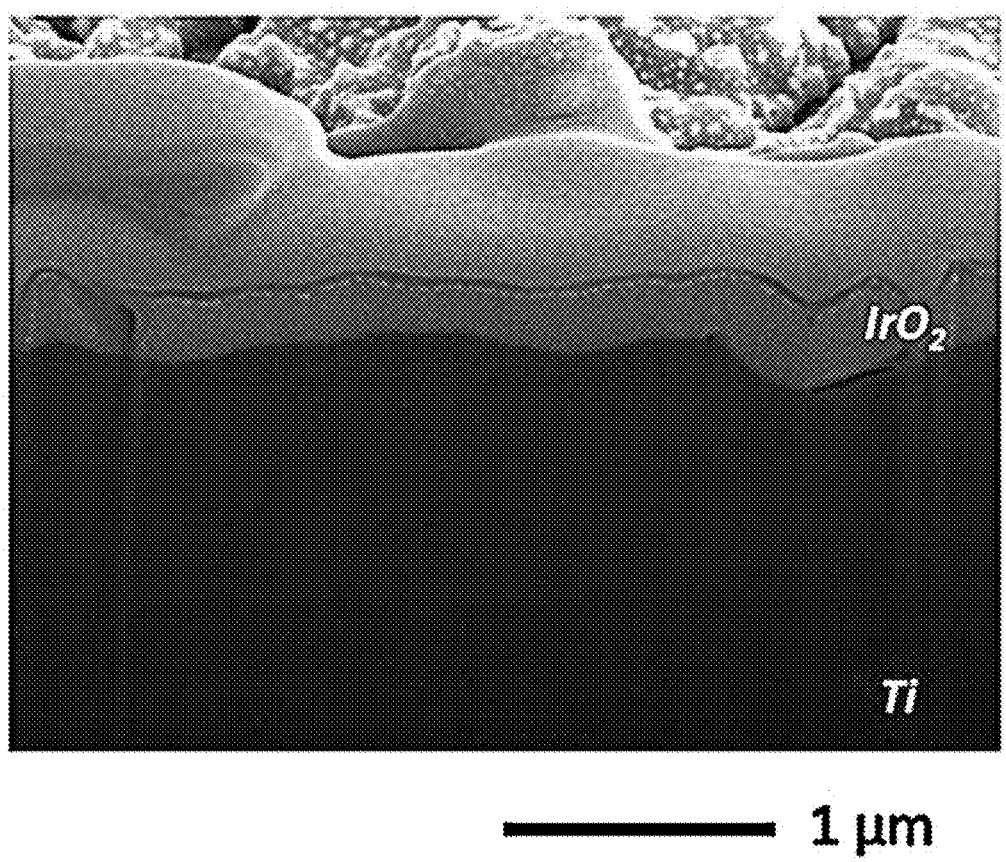
FIG. 7B is a photograph showing the cross-section of e-IrO$_2$/Ti at E$_{dep}$ of 0.7 V and t$_{dep}$ of 5 min.

The change in $IrO_2$ thin film according to the change in time at $E_{dep}$ of 0.7 $V_{SCE}$ is shown in FIGS. 6A to 6E, and even at very short $t_{dep}$ of 1 min (FIG. 6A), the film phase was formed on Ti phase indicative of high nucleation density of $IrO_2$ followed by rapid film formation. Until $t_{dep}$ of 5 min (FIGS. 6B and 6C), the $IrO_2$ thin film uniformly grew on the Ti surface without any formation of surface defects. However, when $t_{dep}$ was further increased to 10 min and 20 min (FIGS. 6D and 6E), the crack and $IrO_2$ agglomerates began to be formed. The formation is determined to probably result from vigorous OER that hindered uniform growth of $IrO_2$ thin film, and the crack formation at high $t_{dep}$ was similarly found for the e-$IrO_2$/CP electrode. The loading amount of $IrO_2$ as a function of $t_{dep}$ ($E_{dep}$=0.7 $V_{SCE}$) is shown in FIG. 7A. The loading amount of $IrO_2$ was roughly proportional to $t_{dep}$ with a slope of about 0.141 mg/cm²·min, indicating a current efficiency of about 15%. The low current efficiency suggested that the majority of charge during $IrO_2$ deposition was consumed by OER (see FIG. 3). FIG. 7B is a cross-sectional view of an e-$IrO_2$/Ti electrode ($E_{dep}$=0.7 $V_{SCE}$, $t_{dep}$=5 min) analyzed with FIB-SEM. The e-$IrO_2$ film with a uniform thickness (183 (±26) nm) was seen on the entire surface of Ti, suggesting that the e-$IrO_2$ could physically block the inner Ti from the external oxidative environment. The thickness was used to evaluate the volume of $IrO_2$ on Ti ($\pi n (Dt+t^2)$, D=diameter of fiber, t=thickness of $IrO_2$, and n=number density of fiber). The measured density of $IrO_2$ was 8.63 g/cm³, which was slightly lower than that of bulk $IrO_2$ (11.66 g/cm³). The lower density of e-$IrO_2$ than that of bulk $IrO_2$ was because the e-$IrO_2$ was basically in amorphous state (p<11.66 g/cm³). However, compared to density values of e-$IrO_2$ (~2 mg/cm³) found in other previous studies, the density of $IrO_2$ in the present study was relatively high, implying the low density of inner-pore that was essential for effective corrosion prevention.

Single Cell Performance Experiment

Figure 8A:
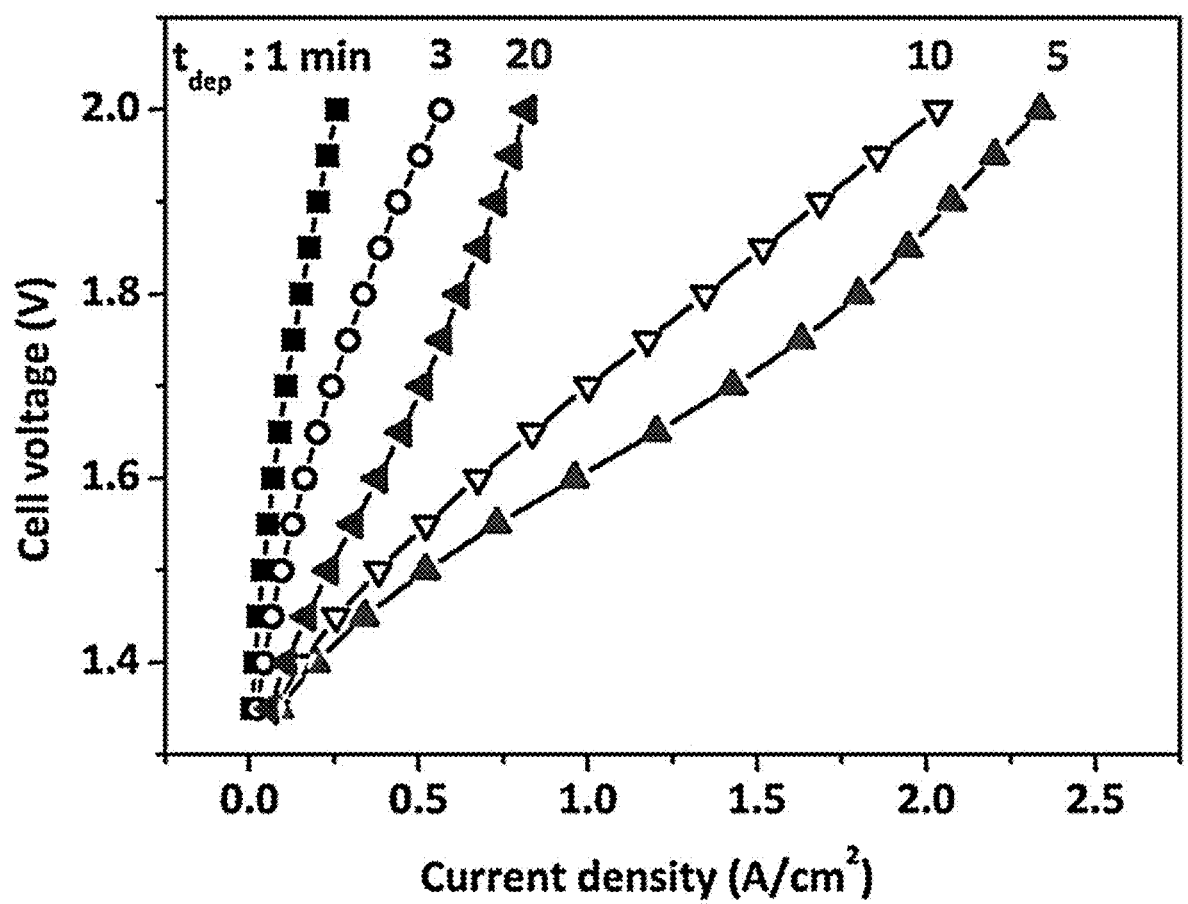
FIG. 8A is iV curves for MEA using e-IrO$_2$/Ti produced by varying t$_{dep}$ under the E$_{dep}$ condition fixed at 0.7 V$_{SCE}$.

The performance of a single cell including an e-$IrO_2$/Ti electrode ($E_{dep}$=0.7 $V_{SCE}$, $t_{dep}$=1 to 20 min) was evaluated at 120° C. and 2.5 bar (FIG. 8A). It could be confirmed that the current density at given potential was dependent upon not only the catalyst loading amount but also the electrode morphology that varied with $t_{dep}$. When $t_{dep}$ was increased from 1 min to 5 min, the current density at 1.6 V was gradually increased from 0.07 A/cm² to 0.96 A/cm². However, during that period, the catalyst loading amount was raised up from 0.01 to 0.40 mg/cm², while no significant change in electrode morphology was seen. In addition, when $t_{dep}$ was further increased up to 10 min, the current density at 1.6 V was suddenly dropped to 0.67 A/cm² despite the increase in catalyst loading amount to 1.05 mg/cm² (FIG. 7B). The further increase in $t_{dep}$ to 20 min resulted in $IrO_2$ loading amount of 2.70 mg/cm², but rather decreased the current density to 0.38 A/cm². The decrease in current density is determined to be because cracks are generated on the electrode surface and $IrO_2$ is agglomerated (FIGS. 6D and 6E).

Figure 8B:
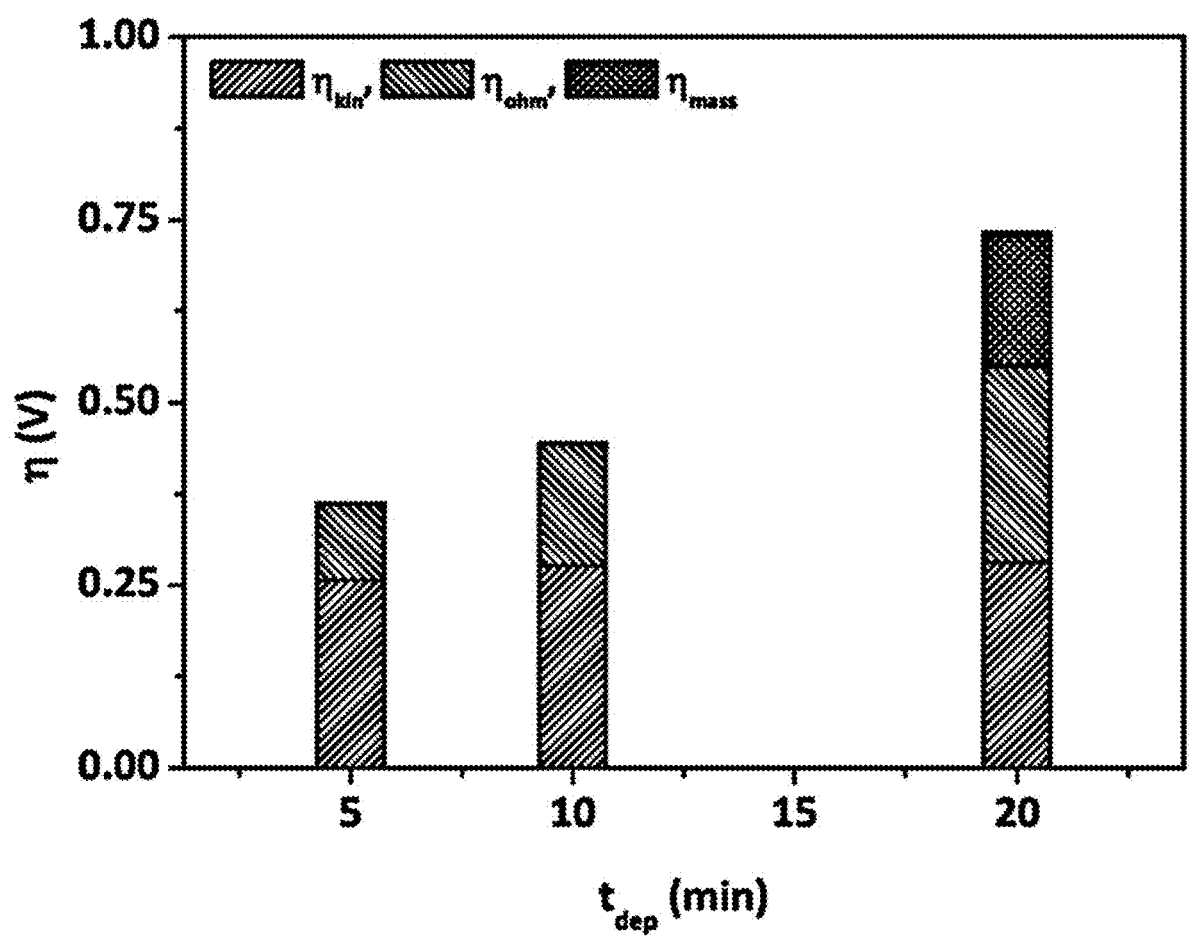
FIG. 8B shows ohmic overpotential ($\eta_{ohm}$) and mass transfer overpotential ($\eta_{mass}$) values at 0.75 A/cm$^2$ for e-IrO$_2$/Ti (t of 5, 10, and 20 min).

An overpotential analysis was carried out in order to explain the sudden drop of electrode efficiency at higher $t_{dep}$ (10 min and 20 min)(FIG. 8B). As shown, it could be confirmed that the ohmic overpotential ($\eta_{ohm}$) was gradually increased when $t_{dep}$ was increased from 5 min (0.105 V) to 10 min (0.168 V) and to 20 min (0.267 V), and the mass transfer overpotential ($\eta_{mass}$) was very small when $t_{dep}$=5 and 10 min but was suddenly increased up to 0.185 V at $t_{dep}$=20 min. Meanwhile, the kinetic overpotential ($\eta_{kin}$) that depended on catalyst activity was changed to only a small extent (0.26 to 0.28 V). Accordingly, it seems that the performance drop at high $t_{dep}$ (10 and 20 min) was primarily ascribed to the ohmic and mass transfer losses. A possible explanation for the increase in $\eta_{ohm}$ is the retarded electron conduction due to the oxidation of Ti during anodic $IrO_2$ electrodeposition. During the $IrO_2$ electrodeposition process, the Ti substrate was simultaneously oxidized into non-conductive $TiO_2$, and this process might be prompted at the cracked sites that were found when $t_{dep}$=10 and 20 min (FIGS. 6D and 6E). As $TiO_2$ became thicker, the electron conductivity on Ti was gradually decreased, leading to the increase in norm. Meanwhile, a sudden increase in $\eta_{mass}$ at $t_{dep}$=20 min was possibly due to the difficulties of O2 transfer at cracks on the $IrO_2$ surface, but further experiments are required in order to clarify the precise reason.

Figure 9A:
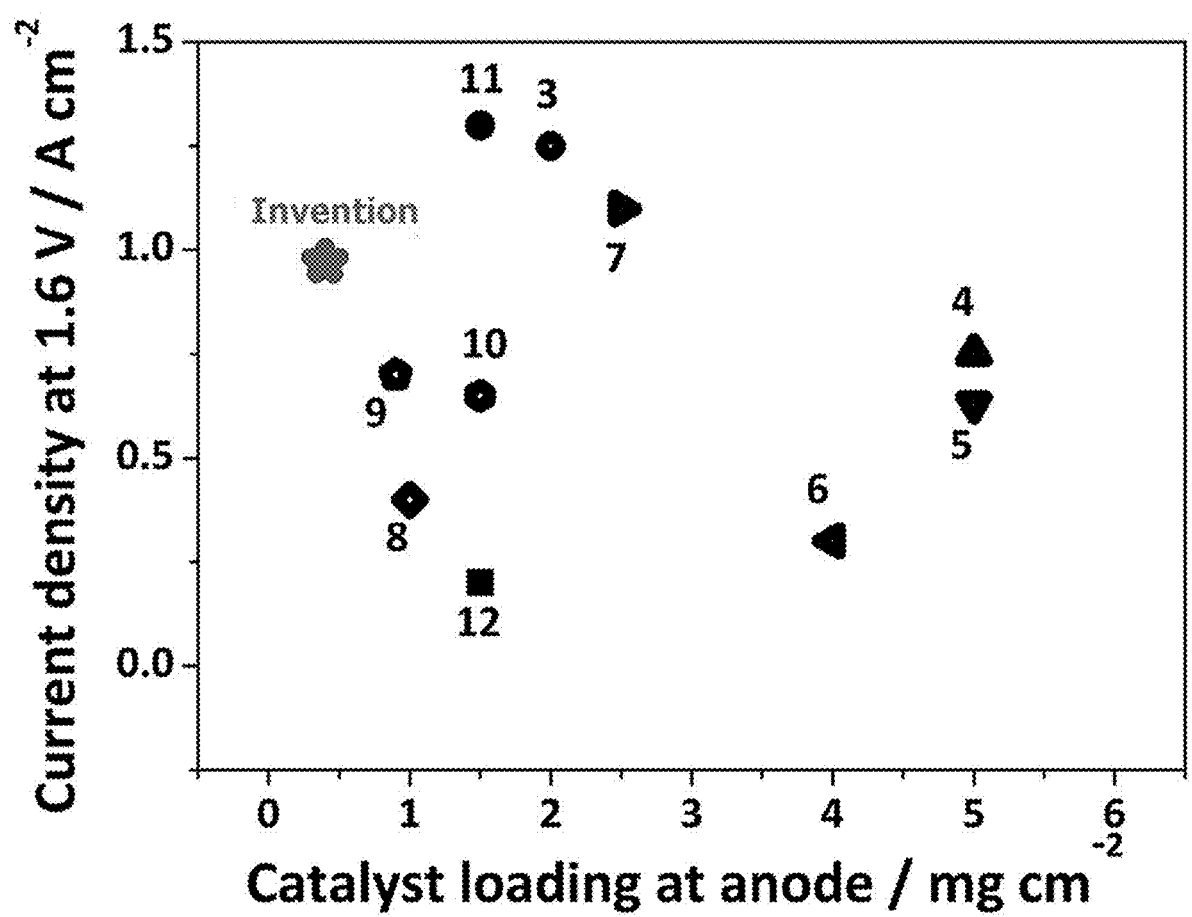
FIGS. 9A and 9B show changes in (A) current density and (B) mass activity according to the change in catalyst loading amount at 1.6 V, 120° C., and 2.5 bar in an e-IrO$_2$/Ti (E$_{dep}$=0.7 V) electrode. At this time, values of other cells within an operating temperature range from 110 to 130° C. are also presented.
Figure 9B:
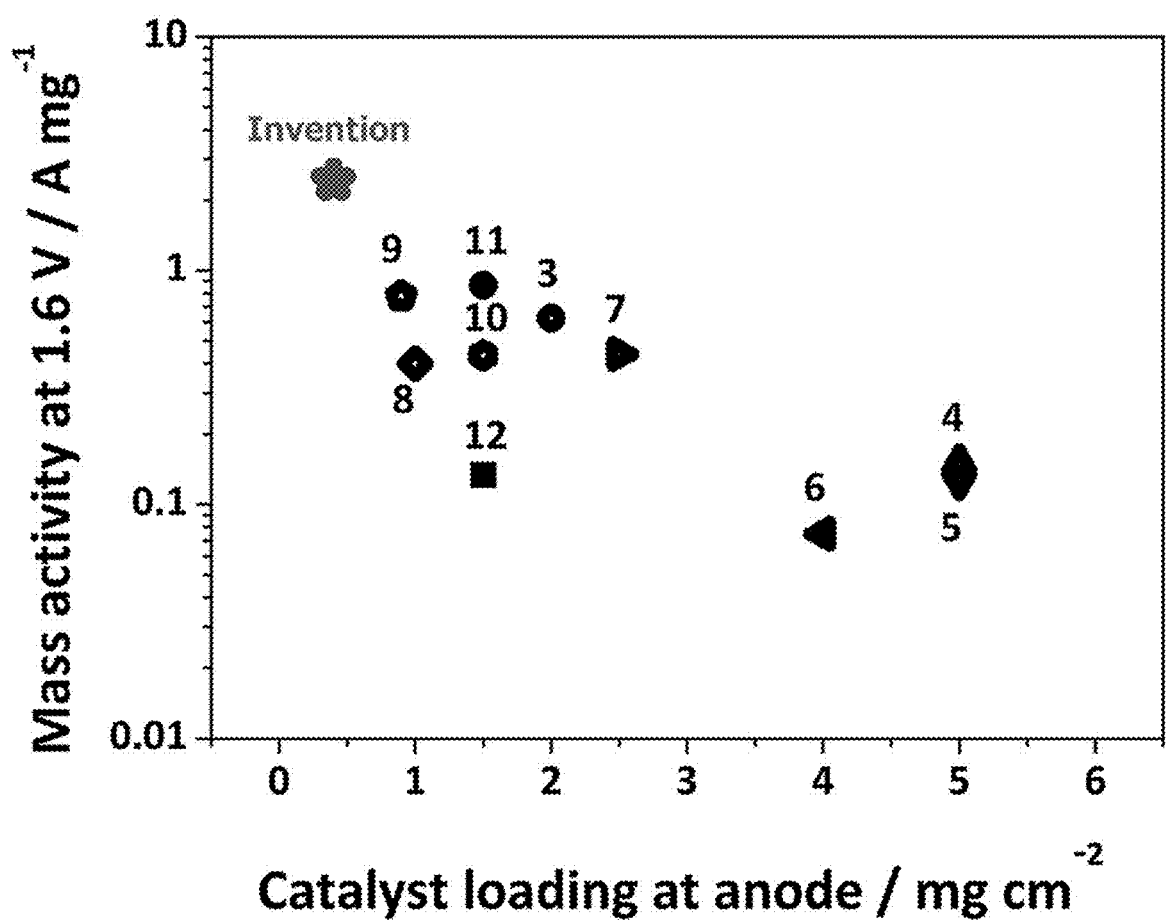

The current densities of e-$IrO_2$/Ti electrodes ($E_{dep}$=0.7 $V_{SCE}$) at 1.6 V were compared with those of the apparatuses where the operating temperature was 110 to 130° C., which are described in B.-S. Lee, H.-Y. Park, I. Choi, M. K. Cho, H.-J. Kim, S. J. Yoo, D. Henkensmeier, J. Y. Kim, S. W. Nam, S. Park, K.-Y. Lee, J. H. Jang, J. Power Sources 309 (2016) 127-134. (Non-patent document 1), and the like. (Non-patent documents 3 to 12) (FIG. 9A). At the documents, the catalyst loading amount ranged from 1 to 5 mg/cm$^2$, which indicated 0.3 to 1.25 A/cm$^2$ at 1.6 V. For comparison, the e-$IrO_2$ electrode ($E_{dep}$=0.7 $V_{SCE}$, $t_{dep}$=5 min)(loading amount: 0.4 mg/cm$^2$) exhibited a current density of 0.96 A/cm$^2$, which was higher than those of most publications (Non-Patent Documents 4, 5, 6, 8, 9, 10, and 12), and comparable to those of a few publications at the highest levels (Non-Patent Documents 3, 7, and 11). The current density at 1.6 V was divided by the anode loading amount, and the resultant mass activity value is shown in FIG. 9B. Under an optimized condition ($E_{dep}$=0.7 $V_{SCE}$, $t_{dep}$=5 min), the e-$IrO_2$ electrode showed a mass activity of 2.43 A/mg, which is about 4-fold higher than the highest value reported in the Non-Patent Documents (Non-Patent Document 11, 0.62 A/mg). This showed the excellent catalyst utilization and cost efficiency of e-$IrO_2$/Ti electrodes.

As mentioned previously, the Ti diffusion layer may be oxidized during cell operation and the oxidation may be prevented by coating a noble metal such as Pt or Au on the Ti diffusion layer. The electrodeposited $IrO_2$ catalyst is capable of protecting Ti from oxidation, requiring no more additional oxidation prevention films. It could be confirmed that the stability of Ti after $IrO_2$ electrodeposition was tested by a polarization analysis in 0.5 M $H_2SO_4$ (FIG. 10), pristine Ti ($t_{dep}$=0 min) exhibited an open circuit potential (OCP) of −0.18 $V_{SCE}$ in consistency with the former work, and on sweeping potential to positive direction, a small current peak was formed at 0.02 $V_{SCE}$, and the current was stabilized at 0.1 to 1.0 $V_{SCE}$. This behavior was a general passivation behavior of Ti and the potential where the current peak was formed is referred to as a passivation potential, and physically means a spot where the passivation begins. Meanwhile, the current peak, which is also referred to as the critical current density (Ic), has been regarded as an indicator showing the stability of a passivation film, and the lower current density means a better stability. When $IrO_2$ was deposited, the OCP shifted in a positive direction, and $I_c$ was changed from 31.76 pA/cm$^2$ (0 min) to 5.66 pA/cm$^2$ (5 min), clearly indicating the improvement of oxidation resistance property.

Figure 11:
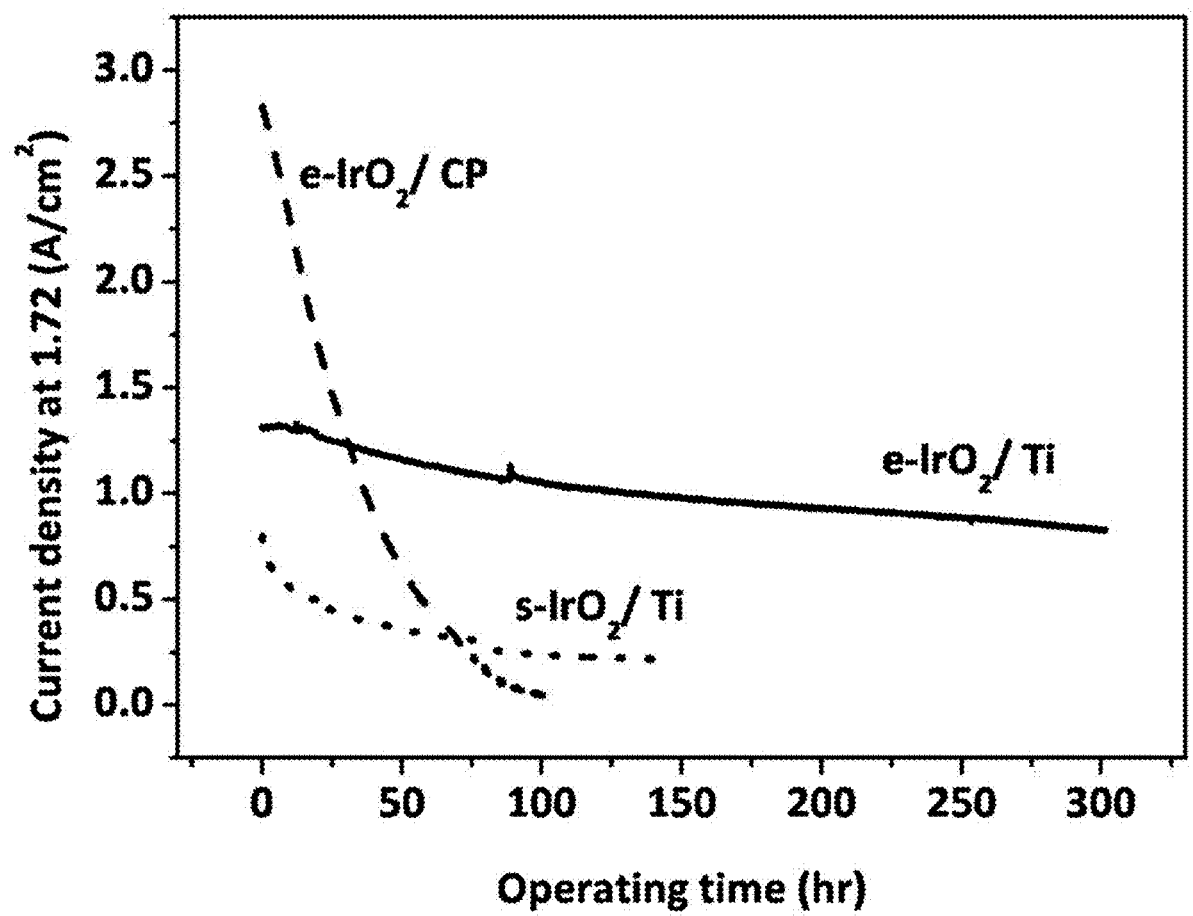
FIG. 11 is a graph showing operation performance drop experimental results of single cells including e-IrO$_2$/Ti, e-IrO$_2$/CP, and s-IrO$_2$/Ti electrodes under the conditions of 1.72 V, 120° C., and 2.5 bar.

Furthermore, the durability of the e-$IrO_2$/Ti electrode could be determined by an aging experiment performed at 1.72 V (voltage efficiency: 85%), 120° C., and 2.5 bar, and for comparison, the durabilities of e-$IrO_2$/CP and s-$IrO_2$/Ti electrodes were also observed under the same operating conditions (FIG. 11).

Figure 10:
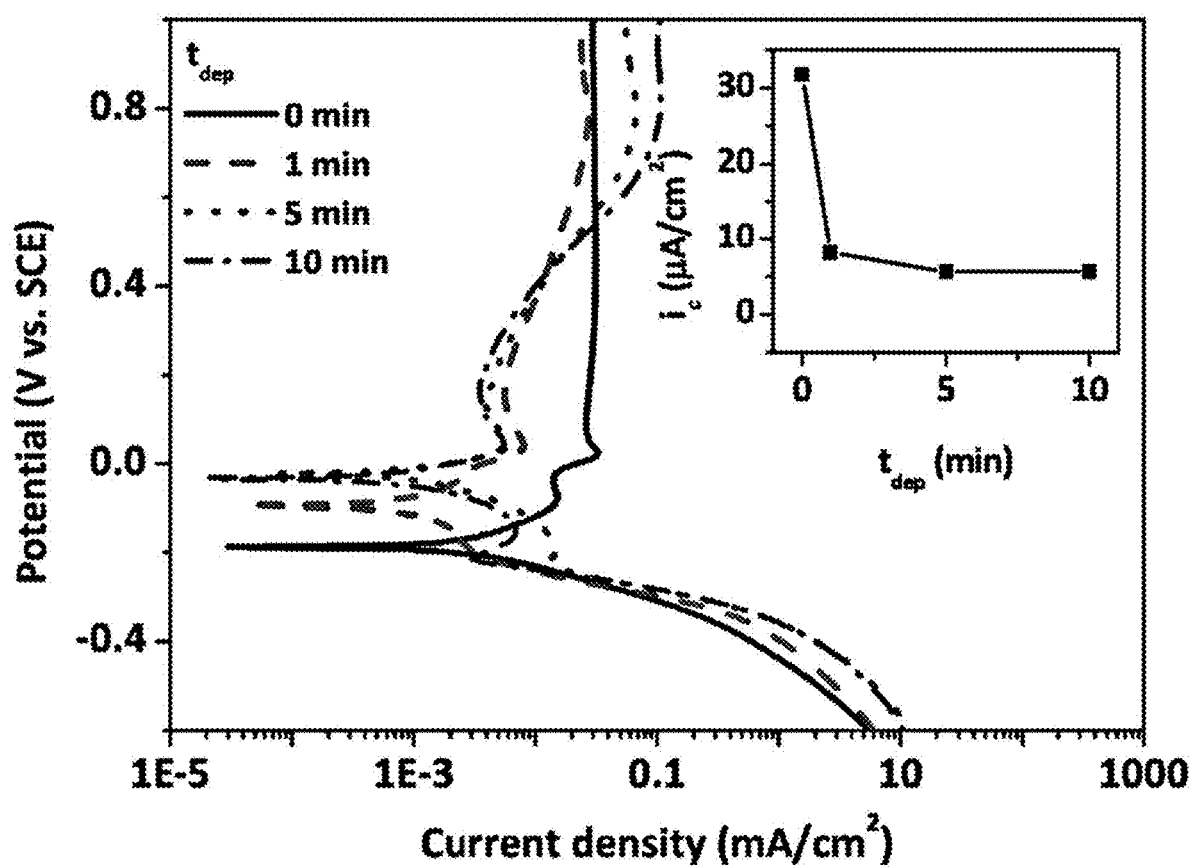
FIG. 10 shows polarization curves for initial and IrO$_2$-electrodeposited Ti meshes in 0.5 M H$_2$SO$_4$ at 25° C. (Inset) at a critical current density as a function of t$_{dep}$.

As shown in FIG. 11, the e-$IrO_2$/Ti exhibited the lowest degradation rate of 1.5 mA/cm$^2$-hr (0.11%/hr), and this value is quite lower than that of e-$IrO_2$/CP (49.4 mA/cm$^2$-hr (1.74%/hr)), indicating the significance of the diffusion layer. More importantly, e-$IrO_2$/Ti was more stable than s-$IrO_2$/Ti, a typical form of the oxygen electrode. The s-$IrO_2$/Ti exhibits a degradation rate of 9.6 mA/cm$^2$-hr (1.20%/hr) for initial 25 hr, and exhibits a degradation rate of 1.8 mA/cm$^2$-hr (0.22%/hr) for 25 to 150 hr. This is due to the improved stability of the Ti diffusion layer from oxidation/corrosion, as shown in FIG. 10, which is compared to the rapid degradation of spray-type electrode at high temperature.

The stability of the e-$IrO_2$/Ti electrode is at a level which is about 2-fold better than the electrode stability reported in Non-Patent Document 13 (degradation rate of 0.75 mA/cm$^2$-hr (0.21%/hr) at 110° C. and 2.78 mA/cm$^2$-hr (0.23%/hr) at 150° C.). The electrode degradation is determined to partially due to the chemical deformation of the nafion membrane at high temperature/high pressure conditions, but considering the experimental results, the electrode degradation is determined to be associated with the oxidation of the Ti diffusion layer, and this is determined to be capable of being prevented by the coating of the corrosion-resistive film. Accordingly, considering the catalyst activity, stability, economic efficiency, and the like, it could be confirmed once again that e-$IrO_2$/Ti is an electrode for HT-PEMWE application.

The Examples of the present disclosure previously described should not be interpreted to limit the technical spirit of the present disclosure. The scope of the present disclosure to be protected is limited only by the matters described in the claims, and those skilled in the art of the present disclosure can improve and change the technical spirit of the present disclosure in various forms. Therefore, such improvements and changes would fall within the scope of the present disclosure to be protected as long as they are obvious to those skilled in the art.

What is claimed is:

1. An $IrO_2$ electrodeposited porous titanium composite layer of a polymer electrolyte membrane water electrolysis apparatus serving as both a diffusion layer and an oxygen electrode, the apparatus comprising:
   a porous titanium (Ti) layer; and
   an electrodeposited iridium oxide ($IrO_2$) layer on the porous Ti layer;
   wherein the porous Ti layer is in a form of titanium mesh having a porosity of 60% to 70%;
   wherein the electrodeposited $IrO_2$ layer comprises amorphous iridium oxide having a density of 7 to 9 g/cm$^3$; and
   wherein the electrodeposited $IrO_2$ layer has a thickness of 10 to 210 nm.

2. The composite layer of the polymer electrolyte membrane water electrolysis apparatus according to claim 1, wherein the $IrO_2$ layer comprises iridium oxide loaded at 0.01 to 1.05 mg/cm$^2$ onto the porous Ti layer.

3. The composite layer of the polymer electrolyte membrane water electrolysis apparatus according to claim 1, wherein the $IrO_2$ layer comprises iridium oxide loaded at 0.1 to 0.5 mg/cm$^2$ onto the porous Ti layer.

4. The composite layer of the polymer electrolyte membrane water electrolysis apparatus according to claim 1, wherein the $IrO_2$ layer is uniformly deposited on the porous Ti layer, and thus physically blocks the porous Ti layer from the external oxidative environment.

5. A polymer electrolyte membrane water electrolysis apparatus comprising the composite layer of the polymer electrolyte membrane water electrolysis apparatus according to claim 1.

6. The polymer electrolyte membrane water electrolysis apparatus according to claim 5, wherein the polymer electrolyte membrane water electrolysis apparatus exhibits a current density of 0.07 to 0.96 A/cm$^2$ at 1.6 V and 120° C.

7. The polymer electrolyte membrane water electrolysis apparatus according to claim 5, wherein the polymer electrolyte membrane water electrolysis apparatus exhibits a current density of 0.16 to 0.96 A/cm$^2$.

8. The polymer electrolyte membrane water electrolysis apparatus according to claim 5, wherein the polymer electrolyte membrane water electrolysis apparatus is a high-temperature polymer electrolyte membrane water electrolysis apparatus which is operated at 200° C. or less.

9. The polymer electrolyte membrane water electrolysis apparatus according to claim 8, wherein the polymer electrolyte membrane water electrolysis apparatus is a high-temperature polymer electrolyte membrane water electrolysis apparatus which is operated at 60° C. or more.

10. A method for preparing an IrO$_2$ electrodeposited porous titanium composite layer of a polymer electrolyte membrane water electrolysis apparatus serving as both a diffusion layer and an oxygen electrode according to claim 1, the method comprising:
   electrodepositing an iridium oxide (IrO$_2$) layer on a porous titanium (Ti) layer.

11. The method according to claim 10, wherein the porous Ti layer comprises one or more selected from a group consisting of Ti layers in a form of titanium paper and mesh.

12. The method according to claim 10, wherein the electrodeposition is performed at a deposition potential of 0.5 to 0.9 V$_{SCE}$.

13. The method according to claim 10, wherein the electrodeposition is performed for 1 min or more and less than 10 min.

14. The method according to claim 10, wherein the electrodeposition is performed for 3 min or more and 8 min or less.

* * * * *